(12) United States Patent
Danilova et al.

(10) Patent No.: US 11,360,346 B2
(45) Date of Patent: Jun. 14, 2022

(54) OPTICAL LENS HAVING A TUNABLE FOCAL LENGTH AND DISPLAY DEVICE INCLUDING THE SAME

(71) Applicant: SAMSUNG ELECTRONICS CO., LTD., Suwon-si (KR)

(72) Inventors: Svetlana Vladimirovna Danilova, Moscow region (RU); Dmitriy Evgenyevich Piskunov, Moscow region (RU); Nikolay Victorovich Muravev, Moscow region (RU); Mikhail Vyacheslavovich Popov, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/395,114

(22) Filed: Aug. 5, 2021

(65) Prior Publication Data
US 2022/0066262 A1 Mar. 3, 2022

(30) Foreign Application Priority Data

Aug. 27, 2020 (RU) .......................... RU2020128504
Mar. 5, 2021 (KR) ........................ 10-2021-0029662

(51) Int. Cl.
*G02F 1/1335* (2006.01)
*G02F 1/1343* (2006.01)
(Continued)

(52) U.S. Cl.
CPC .. *G02F 1/133526* (2013.01); *G02F 1/133524* (2013.01); *G02F 1/133769* (2021.01);
(Continued)

(58) Field of Classification Search
CPC ............................................... G02F 1/133526
See application file for complete search history.

(56) References Cited

U.S. PATENT DOCUMENTS

| 8,300,167 B2 | 10/2012 | Hirato |
| 8,885,139 B2 | 11/2014 | Peyghambarian et al. |

(Continued)

FOREIGN PATENT DOCUMENTS

| WO | 03/101156 A1 | 12/2003 |
| WO | 2011/050455 A1 | 5/2011 |

(Continued)

OTHER PUBLICATIONS

Office Action dated Feb. 19, 2021 issued by the Russian in corresponding Russian Patent Office in Russian Application No. 2020128504/28(050778).

*Primary Examiner* — Edmond C Lau
(74) *Attorney, Agent, or Firm* — Sughrue Mion, PLLC

(57) ABSTRACT

An optical lens having a tunable focal length and a display device including the same are provided. The optical lens includes a control electrode including a plurality of electrode elements, an electroactive material layer provided on the control electrode, and a common electrode spaced apart from the control electrode. The electroactive material layer is interposed between the common electrode and the control electrode. The optical lens includes a plurality of bus sets, each bus set of the plurality of bus sets including a plurality of buses, wherein the plurality of bus sets include a first bus set and a second bus set, the first bus set is configured to apply a first voltage to the plurality of electrode elements to generate a first phase profile of light, and the second bus set is configured to apply a second voltage to the plurality of electrode elements to generate a second phase profile of light.

20 Claims, 13 Drawing Sheets

(51) Int. Cl.
*G02F 1/1337* (2006.01)
*G06F 3/01* (2006.01)

(52) U.S. Cl.
CPC .. *G02F 1/134318* (2021.01); *G02F 2201/121* (2013.01); *G06F 3/013* (2013.01)

(56) References Cited

U.S. PATENT DOCUMENTS

| | | |
|---|---|---|
| 9,129,552 B2 | 9/2015 | Magno et al. |
| 9,140,920 B2 | 9/2015 | Afshari et al. |
| 9,588,349 B2 | 3/2017 | Song et al. |
| 10,056,057 B2 | 8/2018 | Perreault |
| 2007/0290972 A1* | 12/2007 | Meredith ............ G02F 1/13306 345/90 |
| 2008/0212007 A1 | 9/2008 | Meredith |
| 2019/0041558 A1 | 2/2019 | Tekolste |
| 2020/0057309 A1 | 2/2020 | Miller et al. |
| 2021/0063839 A1* | 3/2021 | Koyama ................ G02F 1/061 |

FOREIGN PATENT DOCUMENTS

| | | |
|---|---|---|
| WO | 2016/133278 A1 | 8/2016 |
| WO | 2017/216716 A1 | 12/2017 |

* cited by examiner

OPTICAL LENS HAVING A TUNABLE FOCAL LENGTH AND DISPLAY DEVICE INCLUDING THE SAME

CROSS-REFERENCE TO RELATED APPLICATIONS

This application is based on and claims priority under 35 U.S.C. § 119 to Russian Patent Application No. 2020128504, filed on Aug. 27, 2020, in the Federal Service for Intellectual Property, and Korean Patent Application No. 10-2021-0029662, filed on Mar. 5, 2021, in the Korean Intellectual Property Office, the disclosures of which are incorporated by reference herein in their entireties.

BACKGROUND

1. Field

The disclosure relates to an optical lens having a tunable focal length and an augmented reality/virtual reality display device including the optical lens having a tunable focal length. The disclosure relates to the field of optical systems for focus adjustment according to the location of a virtual object image and/or the location of a real object.

2. Description of Related Art

In augmented reality/virtual reality (AR/VR) systems currently being developed, the importance of designing augmented reality images to allow a virtual object image to be superimposed on a user's real-world image is emerging. From a user's perspective, it may be desirable that an image display device of a state-of-the-art AR/VR system has features such as realistic perception of depth of virtual object images, high vision acuity, a minimized size and weight of the display device, and fast response time.

To realize such features, an optical lens having a variable focal length and a wide range of optical power may be utilized. Also, one of the important requirements of a lens system is for the system to have a small thickness, and a lens system having such a small thickness allows multiple lenses to be used in devices such as smart glasses, augmented reality or virtual reality (AR/VR) headsets, or glasses for vision correction with a tunable focal length and tunable optical power. In particular, there is an increasing need for a simple method of producing an optical lens having a tunable focal length and a wide range of optical power.

In the related art, a vergence-accommodation conflict (VAC) may occur and may cause a user to experience eye fatigue. Most relate art AR/VR headsets have a fixed focal length and virtual images cannot be moved beyond this focal length. For this reason, the focal length of the user's eyes by accommodation and the convergence distance of the eyes by vergence are not in the same plane. In other words, in the case of VR, although information about a virtual object image is provided from where a display device is, the user perceives that an object in the virtual object image that is overlapped on a real image, is at a certain location, and this certain location is not where the display device is, but is at a further distance. Accordingly, the user's eyeballs perform angle adjustment (vergence) to look at the certain location, however, because information about the virtual object image that the user actually obtains comes from where the display device is, that is, from a location closer than the certain location, the user's eyes focus on the location of the display device. This results in a mismatch between the focal plane and the vergence plane, and may cause the user to experience eye fatigue, headache and nausea. That is, in the related art, a so-called VAC occurs when the user views real objects at various distances and virtual objects at a fixed focal length simultaneously through an AR device.

In addition, because most existing AR/VR headsets provide only a fixed focal length, correction of refractive errors in the user's eyes, such as presbyopia, farsightedness, or nearsightedness cannot be performed. Therefore, in order for the user to use an AR/VR device normally, additional vision correction measures such as contact lenses or glasses are required. These additional vision correction measures may adversely affect the entire use of the AR/VR device. This is because appropriately selected lenses for the AR/VR headsets are additionally required in order to correct the refractive errors in the solutions of the related art, which may lead to extra costs or user discomfort when wearing ordinary glasses with the AR/VR devices.

AR/VR devices need a large aperture size to realistically express the depth of a virtual object image. In the related art, large aperture sizes may be achieved by using a diffractive liquid crystal (LC) lens with a multiphase level. The aperture of the LC lens is divided into several Fresnel zones, and each zone includes several electrodes. As the diameter of a lens aperture increases, the number of Fresnel zones into which the lens aperture is divided may increase. Also, as the number of Fresnel zones increases, the size of each zone decreases. As the size of each zone decreases, the width of an electrode in each zone decreases. For example, in order to obtain a diameter of a lens aperture larger than 30 mm at an optical power of up to 3 diopters (D), an electrode with a size (in particular, a width) smaller than 1 μm is required, which is beyond current technological means.

In the related art, there is provided a diffractive lens having a tunable focal length formed of an electroactive material (liquid crystal lens), and this diffractive lens may discretely or continuously tune its focal length and may be included in other optical devices, especially glasses. The focal length of a focus-tunable lens is tuned by shorting each control electrode in adjacent Fresnel zones. However, the thickness of the electrode is significantly small, and thus, the lens manufacturing process is complicated, and optical powers that are not multiples of an original focal length.

In the related art, there is also provided an optical system including liquid lenses with elastic membranes, lenses with fixed optical powers, and a display panel. This system may select a focal plane by using two liquid lenses with elastic membranes sequentially arranged (in the form of a stack). However, the system may achieve only a limited number of focal planes corresponding to optical power values of +3 D, +1 D, −1 D, and −3 D. When a lens is close to a user's eye, the user's eye is able to discern many focal planes with respect to a virtual image, whereas the related art optical system implements only a small number of focal planes. Furthermore, it is impossible to provide a desired specific optical power value because steps by which an optical power is tuned in this solution are not equal.

In the related art, there is also provided an optical system based on an Alvarez lens. Here, focus tuning is performed by laterally shifting one diffractive optical element (DOE) between components of the Alvarez lens. The disadvantage of this system is that it is required to have a generally large size to provide mechanical movements to the components of the system, and the number of achievable focal planes is limited.

In the related art, there is also provided a system in which an active area is moved by using eye tracking over the entire lens aperture, an electrode pattern composed of electrodes having the same width is used, and the optical power may continuously change. The disadvantage of this system is that a large number of addressable electrodes (at least 100 to 400 electrodes) are required in a flat flexible cable (FFC), the size of an active area has to be small, and eye tracking is required, thereby, leading to a high complexity of the system.

SUMMARY

Provided is an optical lens having a tunable focal length.

Also provided is an optical lens having a tunable focal length having a small thickness due to only one lens, such that light diffusion is reduced therein.

Also provided is an optical lens having a tunable focal length that has a wide range of optical power by using only one lens, and thus provides a realistic perception of depth, eliminates vergence-accommodation conflicts, and corrects refractive errors in a user's eye.

Also provided is an augmented reality/virtual reality (AR/VR) display device including an optical lens having a tunable focal length.

Additional aspects will be set forth in part in the description which follows and, in part, will be apparent from the description, or may be learned by practice of the presented embodiments of the disclosure.

In accordance with an aspect of the disclosure, there is provided an optical lens having a tunable focal length. The optical lens includes: a control electrode including a plurality of electrode elements; an electroactive material layer provided on the control electrode; a common electrode spaced apart from the control electrode, wherein the electroactive material layer is interposed between the common electrode and the control electrode; and a plurality of bus sets, each bus set of the plurality of bus sets including a plurality of buses, wherein the plurality of bus sets include a first bus set and a second bus set, the first bus set is configured to apply a first voltage to the plurality of electrode elements to generate a first phase profile of light, and the second bus set is configured to apply a second voltage to the plurality of electrode elements to generate a second phase profile of light.

At least one electrode element among the plurality of electrode elements is configured to receive at least one of the first voltage from the first bus set or the second voltage from the second bus set, and the first voltage is different from the second voltage.

At least one electrode element is configured to alternately receive the first voltage from the first bus set and the second voltage from the second bus set.

The control electrode is configured to operate as a first electrode pattern corresponding to the first phase profile of light, or in a second electrode pattern corresponding to the second phase profile of light.

Each electrode element of the plurality of electrode elements in the control electrode is connected to the first bus set and the second bus set, the electroactive material layer is configured to provide a first optical power based on the first voltage being applied to generate the first phase profile of light, and the electroactive material layer is configured to provide a second optical power based on the second voltage being applied to generate the second phase profile of light.

Two electrode elements adjacent to each other among the plurality of electrode elements in the control electrode are configured to receive a same voltage from the first bus set, or receive different voltages from the second bus set.

Each of the plurality of electrode elements in the control electrode is connected to the first bus set and the second bus set through via-holes.

The control electrode further includes one or more electrode groups corresponding to one or more Fresnel zones.

The first bus set of the plurality of bus sets includes: a first bus configured to apply the first voltage to a first electrode group of the one or more electrode groups; and a second bus configured to apply the second voltage different from the first voltage to a second electrode group of the one or more electrode groups.

A first area of the electroactive material layer corresponding to the first electrode group and a second area of the electroactive material layer corresponding to the second electrode group have different optical power values.

The plurality of electrode elements in the control electrode have a concentric ring shape.

The plurality of electrode elements in the control electrode have a polygonal set electrode shape or a parallel stripe electrode shape.

The electroactive material layer includes at least one of nematic liquid crystals, smectic liquid crystals, cholesteric liquid crystals, a polymer gel, electroactive polymers, liquid crystalline polymers, polymer dispersed liquid crystals, polymer-stabilized liquid crystals, or self-assembled nonlinear supramolecular structures.

The optical lens having the tunable focal length is of a polarization-dependent structure or a polarization-independent structure.

In accordance with an aspect of the disclosure, there is provided an augmented reality and/or virtual reality display device including the optical lens having the tunable focal length.

The device further includes: an optical waveguide; and a virtual object image source configured to provide a virtual object image, wherein the optical lens having the tunable focal length is provided on the optical waveguide.

The optical waveguide includes a first side facing a user's eye and a second side opposite to the first side, and the optical lens having the tunable focal length is provided on the first side.

The optical waveguide includes a first side facing a user's eye and a second side opposite to the first side, and the optical lens having the tunable focal length is provided on the second side.

The optical lens having the tunable focal length is between the optical waveguide and the virtual object image source.

The optical lens having the tunable focal length is configured to correct a refractive error in a user's eye.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
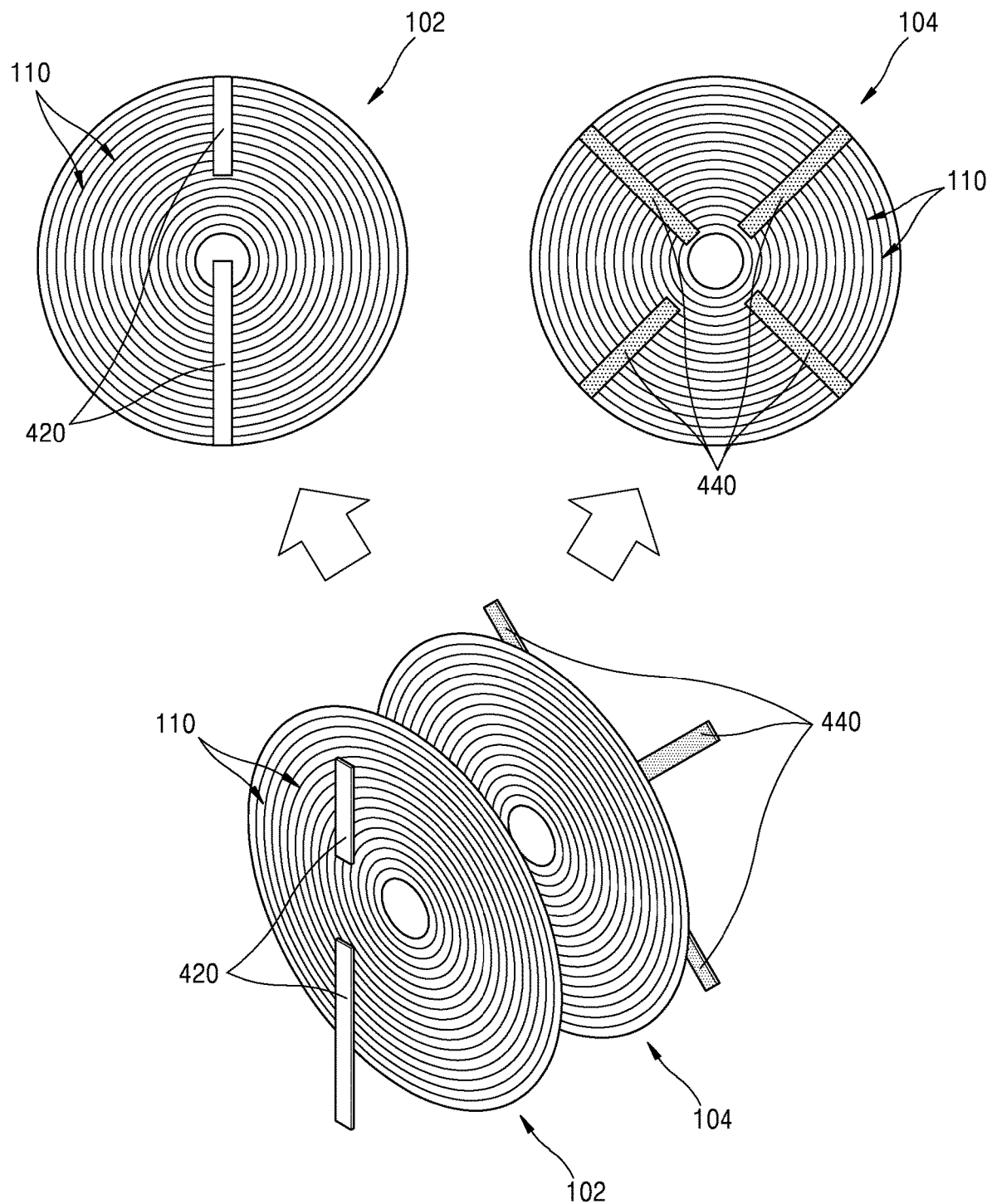
FIG. 1A is a conceptual diagram visually representing a plurality of electrode patterns of a control electrode according to an embodiment.

Hereinafter, embodiments of the disclosure will be described in detail with reference to the accompanying drawings. The described embodiments are merely exemplary, and various modifications are possible from these embodiments. In the following drawings, the same reference numerals refer to the same elements, and the size of each element in the drawings may be exaggerated for clarity and convenience of description.

An expression "above" or "on" used herein may include not only "immediately on in a contact manner" but also "on in a non-contact manner".

The singular expression also includes the plural meaning as long as it is not inconsistent with the context. In addition, when an element "includes" or "comprises" an element, unless there is a particular description contrary thereto, the element can further include other elements, not excluding the other elements.

Throughout the disclosure, the expression "at least one of a, b or c" indicates only a, only b, only c, both a and b, both a and c, both b and c, all of a, b, and c, or variations thereof.

The term "a", "an" and "the" and other demonstratives similar thereto should be understood to include a singular form and plural forms.

The term "connection" may include not only physical connection but also optical connection.

In addition, example terms (for example, "such as" and "etc.") are used for the purpose of description and are not intended to limit the scope of the disclosure unless defined by the claims.

The terms such as "first" or "second" may be used to describe various components, but the components should not be limited to the terms. The terms are used only to distinguish one component from other components. An optical lens having a tunable focal length may indicate an optical lens having a tunable focal length.

In the disclosure, when an electrode element is referred to as being connected to a bus set, it means that the electrode element is connected to one bus of the bus set.

Figure 1B:
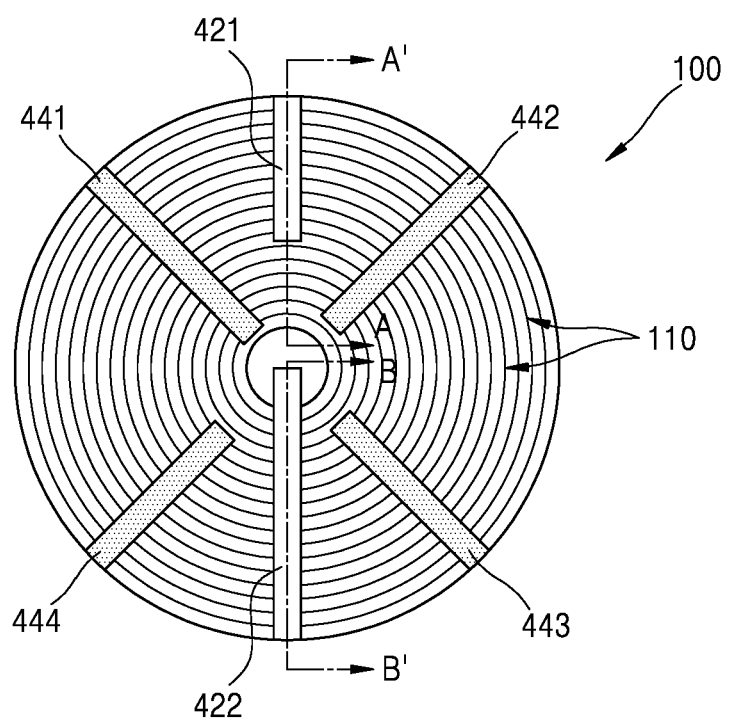
FIG. 1B is a conceptual diagram illustrating a control electrode and a plurality of bus sets according to an embodiment.
Figure 2A:
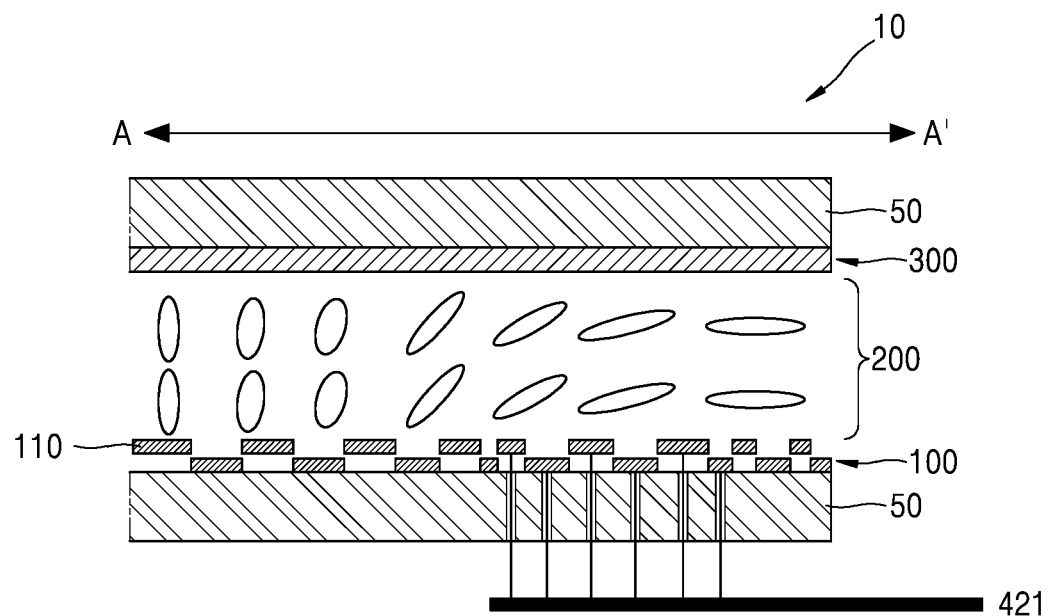
FIG. 2A is a cross-sectional view of the control electrode taken along a line A-A' in the embodiment of FIG. 1B.
Figure 2B:
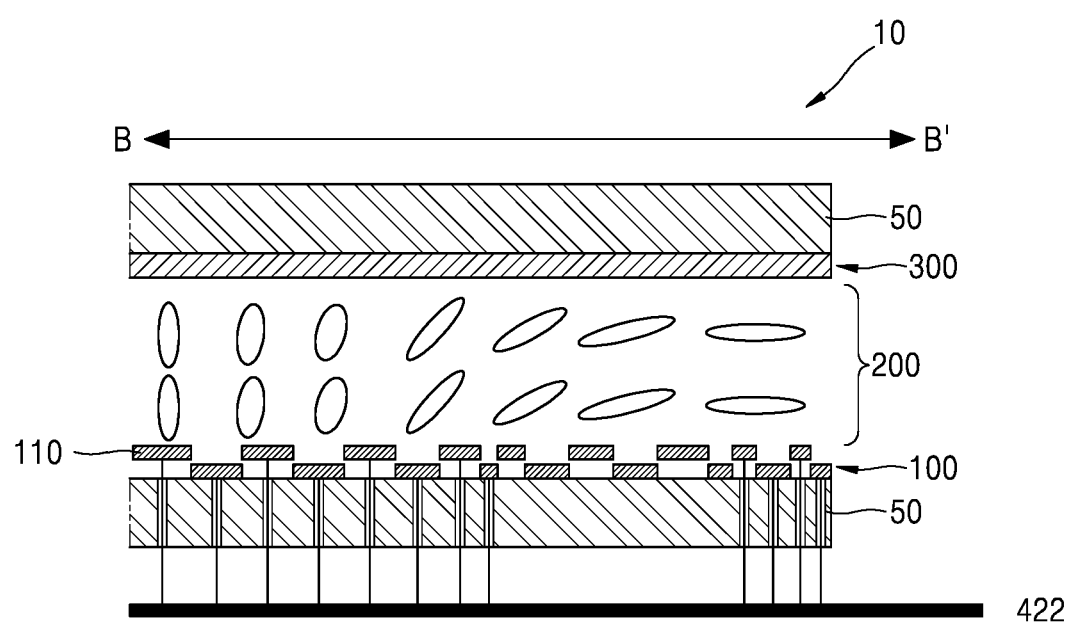
FIG. 2B is a cross-sectional view of the control electrode taken along a line B-B' in the embodiment of FIG. 1B.

FIG. 1A is a conceptual diagram visually representing a plurality of electrode patterns 102 and 104 (hereinafter, also referred to as the first electrode pattern 102 and the second electrode pattern 104) of a control electrode 100 according to an embodiment. FIG. 1B is a conceptual diagram illustrating the control electrode 100 and a plurality of bus sets 420 and 440 (hereinafter, also referred to as the first bus set 420 and the second bus set 440). FIG. 2A is a cross-sectional view of the control electrode 100 taken along a line A-A' in the embodiment of FIG. 1B. FIG. 2B is a cross-sectional view of the control electrode 100 taken along a line B-B' in the embodiment of FIG. 1B.

Referring to FIGS. 1A to 2B, an optical lens having a tunable focal length 10 according to an embodiment of the disclosure may provide a wide range of optical power and thus implement multiple focal planes by tuning the focal length, thereby more realistically expressing a virtual object image in an augmented reality or virtual reality (AR/VR) optical system. The AR/VR optical system may include the control electrode 100 including a plurality of electrode elements 110, an electroactive material layer 200 on the control electrode 100, a common electrode 300 spaced apart from the control electrode 100 with respect to the electroactive material layer 200 therebetween, and bus sets each including a plurality of buses. The bus sets may include the first bus set 420 including a plurality of buses 421 and 422 (hereinafter, also referred to as the first bus 421 and the second bus 422). The first bus set 420 may apply a voltage to the plurality of electrode elements 110 to generate a first phase profile of light. The second bus set 440 may include a plurality of buses 441, 442, 443, and 444 (hereinafter, also referred to as the third bus 441, the fourth bus 442, the fifth bus 443, and the sixth bus 444). The second bus set 440 may apply a voltage to the plurality of electrode elements 110 to generate a second phase profile of light. The optical lens having a tunable focal length 10 may be used as a multifocal lens that provides various focal planes by itself, and one or more optical lenses having a tunable focal length 10 may be used to provide an AR/VR display device that allows a virtual object image and a real-world image to be superimposed and viewed.

Referring to FIG. 1A, the control electrode 100 may include the plurality of electrode elements 110. Each of the plurality of electrode elements 110 may be connected to the first bus set 420 and the second bus set 440 (collectively referred to as "the plurality of bus sets 420 and 440). Here, the control electrode 100 may operate as the first electrode pattern 102 based on connection with the first bus set 420 among the plurality of bus sets, and may operate as the second electrode pattern 104 based on connection with the second bus set 440 among the plurality of bus sets. Because each of the plurality of electrode elements 110 may be connected to the plurality of bus sets 420 and 440, even though the control electrode 100 has a single physical pattern, the control electrode 100 may operate as the plurality of electrode patterns 102 and 104 according to the plurality of bus sets 420 and 440. That is, when the first bus set 420 applies a voltage to the control electrode 100, the control electrode 100 may operate as the first electrode pattern 102, whereas, when the second bus set 440 applies a voltage to the control electrode 100, the control electrode 100 may operate as the second electrode pattern 104. Here, the plurality of bus sets 420 and 440 may alternately apply voltages to the control electrode 100. Accordingly, one control electrode 100 may operate as if two electrode patterns 102 and 104 are superimposed, in which the term "superimposed" does not mean that two electrode pattern layers are physically superimposed with each other, the control electrode 100 may operate as either of the plurality of electrode patterns 102 and 104 at a time according to voltages applied to the plurality of electrode elements 110 of one control electrode 100, and this can be understood as a kind of electrode topologies. That is, the plurality of bus sets 420 and 440 may be connected to each of the plurality of electrode elements 110 of the control electrode 100, different voltages may be applied to the plurality of bus sets 420 and 440, thus one control electrode 100 may operate as either of the plurality of electrode patterns 102 and 104 at a time, and the electrodes are referred to as being superimposed. However, the number of electrode patterns are not limited thereto, and there may be one or more the electrode patterns according to the voltages applied by the plurality of electrode elements.

Referring to FIG. 1B, one electrode of the plurality of electrode elements 110 of the control electrode 100 may be connected to one bus of the first bus set 420 among the plurality of bus sets, and one bus of the second bus set 440 among the plurality of bus sets, to receive different voltages. In this case, the two buses connected to one electrode may alternately apply the voltages rather than simultaneously applying the voltages. For example, one of the plurality of electrode elements 110 of the control electrode 100 may be connected to the second bus 422 of the first bus set 420 among the plurality of bus sets, and the third bus 441 of the second bus set 440 among the plurality of bus sets, to receive different voltages.

The control electrode 100 may include at least one electrode group, and each electrode group may correspond to at least one Fresnel zone that allows the corresponding electroactive material layer 200 to have at least one optical power value. In addition, the control electrode 100 may include at least two sets of Fresnel zones, as it is connected to the plurality of bus sets 420 and 440. In addition, the control electrode 100 may implement one or more phase profiles of light by receiving one or more voltages from the plurality of bus sets 420 and 440. The control electrode 100 may implement a set of phase profiles of light including several phase profiles of light from one of the plurality of bus sets 420 and 440.

Referring to FIG. 2A, the cross-sectional view taken along the line A-A' of FIG. 1B shows that the first bus 421 is connected to some of the plurality of electrode elements 110 through via-holes 40, and, referring to FIG. 2B, the cross-sectional view taken along line B-B' shows that the second bus 422 is connected to some of the plurality of electrode elements 110 through via-holes. The electrode element 110 connected to the first bus 421 of the first bus set 420 may not be connected to the second bus 422 of the first bus set 420. Similarly, the third bus 441 to the sixth bus 444 of the second bus set 440 may also be connected to some of the plurality of electrode elements 110 through other via-holes.

According to an embodiment of the disclosure, a substrate 50 of the control electrode 100 may be made of a material that is transparent in a visible band, such as glass, plastic, or quartz. In addition, the substrate 50 may have a thickness of about 3 to 200 µm.

According to an embodiment of the disclosure, each of the plurality of electrode elements 110 of the control electrode 100 and the common electrode 300 may be formed of indium tin oxide (ITO). According to another embodiment of the disclosure, each of the plurality of electrode elements 110 and the common electrode 300 may be formed of indium zinc oxide (IZO), which is a transparent conductive material, or may be formed of indium oxide, tin oxide, zinc oxide, or the like. Each of the plurality of electrode elements 110 and the common electrode 300 may have a thickness of about 30 to 200 nm depending on an electrode material or the like.

The value of the refractive index of the electroactive material layer 200 may be changed by an applied voltage. That is, the orientation of particles constituting the electroactive material layer 200 may be aligned or changed by a voltage, and accordingly, the optical power of the optical lens having a tunable focal length 10 may be changed.

Here, the optical power is a refractive power for converging or diverging light in a lens, a mirror, or an optical system, and corresponds to the reciprocal of a focal length. With a specific optical power value, light may be focused on a focal plane corresponding to the specific optical power value. The control electrode 100 may generate a set of phase profiles of light by receiving different voltages from one of the plurality of bus sets 420 and 440, and the phase profiles of light may have different optical powers. Accordingly, the control electrode 100 connected to the plurality of bus sets 420 and 440 may provide at least two sets of optical powers.

When voltages are applied to the plurality of electrode elements 110 of the control electrode 100, the orientation of the particles of the electroactive material layer 200 may be changed, and voltage profiles at this time may correspond to phase profiles of light of the optical lens having a tunable focal length 10 having a certain optical power. The correlation and conversion of such voltage profiles and phase profiles of light are related to the inherent phase-voltage dependency of each of electroactive materials.

According to an embodiment of the disclosure, the electroactive material may include, but is not limited to, nematic liquid crystals, smectic liquid crystals, and cholesteric liquid crystals. In a case where the electroactive material is liquid crystal (LC), when a voltage is applied, the orientation of the liquid crystal changes according to the voltage, and the refractive index changes accordingly. According to another embodiment of the disclosure, the electroactive material may include a polymer gel, electroactive polymers, liquid crystalline polymers, polymer dispersed liquid crystals, polymer-stabilized liquid crystals, self-assembled nonlinear supramolecular structures, or the like. The electroactive material may be appropriately selected in consideration of properties such as response time, applied driving voltage value, crystal orientation control method, or the like, according to an application aspect of the optical lens having a tunable focal length 10 requiring the corresponding properties.

Referring to FIGS. 1A and 1B, the electrode elements 110 of the first electrode pattern 102 may be electrically connected to the first bus set 420, and the electrode elements 110 of the second electrode pattern 104 may be electrically connected to the second bus set 440. For example, the first bus set 420 may include the first bus 421 and the second bus 422, and the second bus set 440 may include the third bus 441, the fourth bus 442, the fifth bus 443, and the sixth bus 444. Each electrode element 110 may be connected to one bus among the first bus set 420 and the second bus set 440. Here, in a case of N bus sets (where N is a natural number greater than or equal to 1), each electrode element 110 may be connected to one bus for each bus set, and accordingly, there may be a total of N electrical connections per electrode element. That is, for example, one electrode element 110 of the control electrode 100 may be connected to the first bus 421 of the first bus set 420 and the third bus 441 of the second bus set 440, and another electrode element 110 of the control electrode 100 may be connected to the first bus 421 of the first bus set 420 and the fifth bus 443 of the second bus set 440.

Referring to FIGS. 1A and 1B, the control electrode 100 may operate as one of the first electrode pattern 102 and the second electrode pattern 104 at a time. The first electrode pattern 102 and the second electrode pattern 104 may appear to be superimposed on each other. To this end, the control element 110 may be connected to the first bus set 420 and the second bus set 440. Here, the plurality of bus sets 420 and 440 may be arranged so as not to overlap each other. In addition, the buses of one of the plurality of bus sets 420 and 440 may be arranged so as not to overlap with other buses of the plurality of bus sets 420 and 440. For example, each of the plurality of buses 421, 422, 441, 442, 443, and 444 may be arranged so as not to be overlapped with each other.

The bus serves to apply a voltage to the electrode element 110 connected thereto, and because each electrode element 110 is connected to a plurality of buses, different voltages may be applied to one electrode element. The variability or tunability of the focal length f of the optical lens having a tunable focal length 10 may be obtained as each different voltage is applied to the electrode element 110 through two or more different buses connected to the electrode element 110. That is, the refractive index of the electroactive material layer 200 may be changed according to voltage profiles applied through the buses, such that the set of phase profiles of light may be generated, and thus, a wide range of optical power value may be provided. For example, the optical power value may have a range of about −3 diopters (D) to 3 D.

The plurality of buses 421, 422, 441, 442, 443, and 444 and the electrode elements 110 may be connected to each other through via-holes or in a similar scheme. One bus and one electrode element 110 may be connected to each other through one via-hole, and, in a case where the number of buses connected to one electrode element 110 is N (where N is a natural number greater than or equal to 1), the electrode element 110 and the plurality of buses may be connected to each other through N via-holes. Each electrode element 110 may be connected to a plurality of buses that apply different voltage values, and accordingly, a plurality of voltage profiles and a plurality of Fresnel zones may be generated. In other words, each Fresnel zone may be created for each voltage profile among the plurality of voltage profiles. The plurality of Fresnel zones may provide a plurality of optical powers.

The plurality of buses may be formed of the same material as the electrode element. That is, they may be formed of ITO, IZO, indium oxide, tin oxide, zinc oxide, or the like. The bus is generally formed of a material having high conductivity, and may include silver (Ag), molybdenum (Mo), nickel (Ni), or the like, which is non-transparent in a visible band.

According to an embodiment of the disclosure, the plurality of electrode elements 110 of the control electrode 100 may have a shape of concentric rings. However, the embodiment of the control electrode 100 is not limited to an example of electrode elements having the shape of concentric rings, and the control electrode may be implemented with various other shapes of electrodes. For example, the plurality of electrode elements 110 of the control electrode 100 may have a shape of an array of polygonal or parallel stripe-shaped electrode elements or may be composed of irregularly shaped electrode elements.

According to an embodiment of the disclosure, when the electrode elements 110 of the control electrode 100 have a shape of rings, it may be preferable that they are arranged to form concentric circles. According to some embodiments of the disclosure, a first electrode element may be arranged at the center of the control electrode 100 and may have a circular shape.

The selection of the shape of the electrode elements may be related to the type of the optical lens having a tunable focal length designed in an embodiment of the disclosure. The optical lens having a tunable focal length may or may not depend on polarization of incident light. According to an embodiment of the disclosure, a polarization-dependent configuration may be used in the optical lens having a tunable focal length in which the electrode elements are formed in a parallel stripe shape. Here, in order to focus light polarized along an X axis, an electrode element that provides a director having an X axis orientation may be used, and, in order to focus light polarized along a Y axis, an electrode element that provides a director having a Y axis orientation may be used. The use of a polarization-dependent or polarization-independent optical lens having a tunable focal length has an advantage of, in particular, separating a virtual object image and a real-world image from each other. This separation is based on polarization, and through this, parameters of each image may be independently controlled.

In an example in which the electrode element of the control electrode is formed into a ring electrode, two or more electrode patterns are required to focus light by a spherical lens. For example, one electrode pattern may have a director orientation parallel to the X direction so as to focus light polarized in the X direction, while another electrode pattern may have a director orientation parallel to the Y direction so as to focus light polarized in the Y direction.

In addition, the shape of the electrode element may be selected to reduce the thickness of an optical system (by selecting a ring-shaped electrode element), simplify the electrode element manufacturing process (by selecting a stripe-shaped electrode element), or the like.

In the optical lens having a tunable focal length 10, the radius of each electrode element 110 in the first electrode pattern 102 and the second electrode pattern 104 may be defined by each other. In other words, the control electrode 100 may have a plurality of the electrode element 110 with the radius of the first electrode pattern 102 and the second electrode pattern 102. The width of electrodes (hereinafter, referred to as the first electrodes) of the first electrode pattern 102 may be greater than the width of electrodes (hereinafter, referred to as the second electrodes) of the second electrode pattern 104. For example, an first electrode includes some second electrodes, then a voltage from a same bus may be applied to those some second electrodes. That is, the second electrodes may form one electrode having a substantially greater width.

According to the optical lens having a tunable focal length 10 according to an embodiment of the disclosure, the total number of electrodes of the control electrode 100 may be less than or equal to the sum of the number of the electrodes of the plurality of electrode patterns 102 and 104. In the latter case, as described above, the electrodes are combined into one electrode, and in this case, the gap between the electrodes may be smaller than the technical restriction.

A voltage may be applied to the control electrode 100 according to phase and voltage properties (phase-voltage dependency) of the electroactive material of the optical lens having a tunable focal length 10. A phase profile of light may be defined by an optical power value, and may be calculated according to Equation 1 below.

$$\varphi(r) = -\frac{2\pi r^2}{\lambda} \frac{1}{2f} \quad \text{[Equation 1]}$$

In Equation 1, $\varphi(r)$ denotes a phase profile of light, r denotes a radial coordinate, $\lambda$ denotes a light wavelength, and f denotes a focal length (the reciprocal of the optical power). Throughout the disclosure, the phase profile of light represents, with respect to coordinates on the surface of the optical lens having a tunable focal length 10, a phase delay dependency applied to light passing through the coordinates. The range of phase delay may be divided into a finite number of levels, which are hereinafter referred to as quantization levels. A voltage to be applied to the control electrode 100 may be calculated according to the total number of the plurality of electrode elements 110 of the control electrode 100 and the positions of the plurality of electrode elements 110 on the lens aperture. Here, a voltage profile may be calculated such that a target phase profile approaches as close as possible to a phase profile of light of an infinitely thin optical lens having a certain optical power.

Because the number of electrode elements 110 is finite and the number is limited according to the width of the electrode elements 110, the above approximation may be quantized to a series of quantization levels. Accordingly, a voltage to be applied to each electrode element 110 may be represented by a step or a quantization level, and voltages of the plurality of electrode elements 110 may have quantized result values rather than continuous voltage profiles (see Piskunov, Dmitry E., et al. "Tunable lens for AR headset." Digital Optics for Immersive Displays II. Vol. 11350. International Society for Optics and Photonics, 2020).

Figure 3:
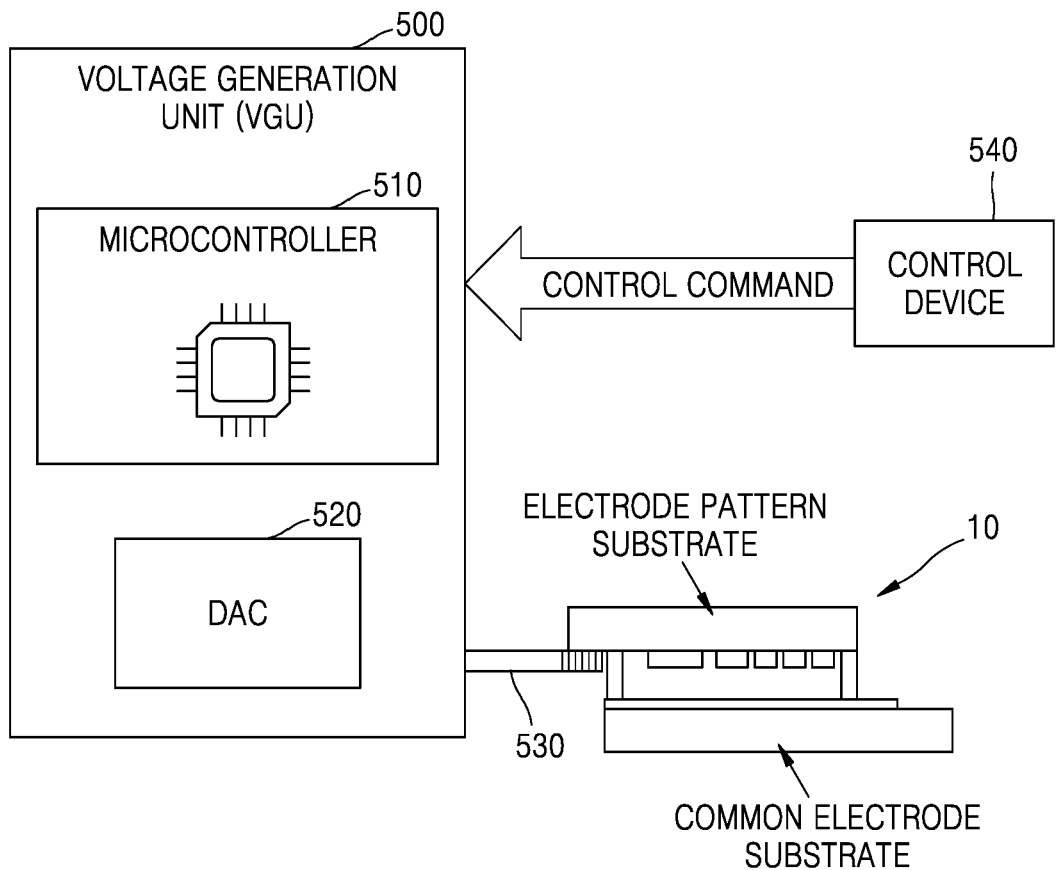
FIG. 3 illustrates operations of a voltage generation unit for an optical lens having a tunable focal length, according to an embodiment.
Figure 4:
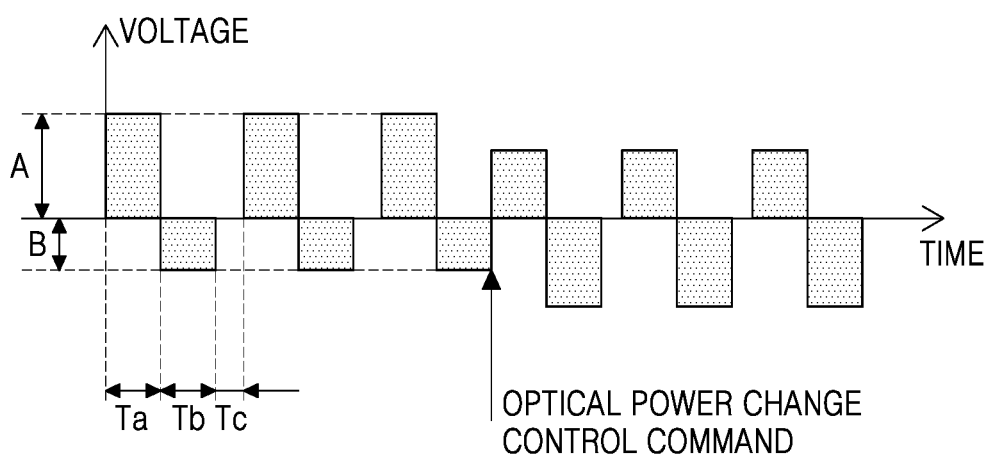
FIG. 4 schematically illustrates a series of electrical pulses provided to buses of an optical lens having a tunable focal length to generate a voltage profile, according to an embodiment.
Figure 5:
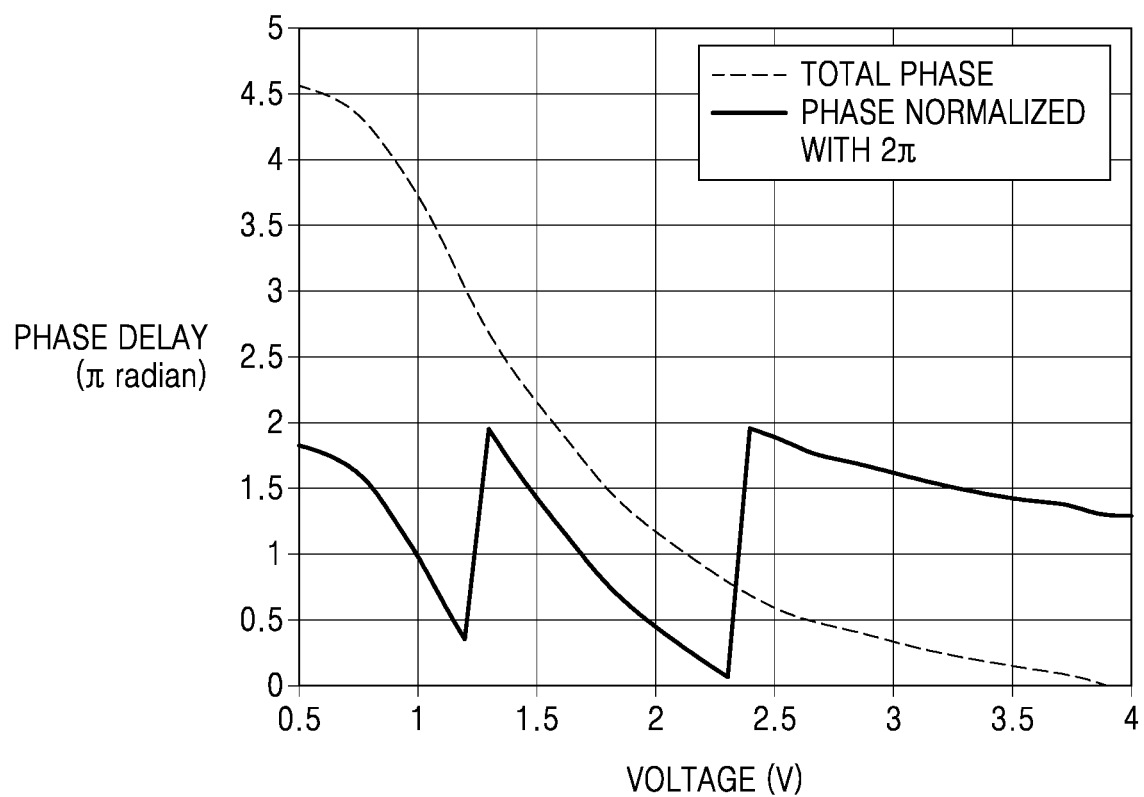
FIG. 5 is a graph of an example of voltage-phase properties of an electroactive material in an embodiment in which an optical lens having a tunable focal length is a liquid crystal optical lens having a tunable focal length.

FIG. 3 illustrates operations of a voltage generation unit (VGU) 500 for the optical lens having a tunable focal length 10, according to an embodiment of the disclosure. FIG. 4 schematically illustrates a series of electrical pulses provided to the buses of the optical lens having a tunable focal length 10 of FIG. 2A to generate a voltage profile, according to an embodiment of the disclosure. FIG. 5 is a graph of an example of voltage-phase properties of the electroactive material in an embodiment of the disclosure in which the optical lens having a tunable focal length 10 of FIG. 2A is a liquid crystal optical lens having a tunable focal length.

In order to obtain a phase profile of light, a voltage may be applied to the plurality of electrode elements 110 according to a voltage profile corresponding thereto, which may be controlled by several units. Further, application of a voltage to each electrode element 110 to operate the control electrode 100 as one of the plurality of electrode patterns 102 and 104 at a time may be controlled by several different units. For example, the application of a voltage may be controlled by one or more computers, processors, integrated circuits, or the like, under the control by one or more programs, program modules, firmware, or the like.

Referring to FIG. 3, application of a voltage to each electrode element of the control electrode 100 through the plurality of bus sets 420 and 440 may be performed by the voltage generation unit (VGU) 500. The VGU 500 may include a microcontroller 510 and a digital-to-analog converter (DAC) 520 with multiple inputs and outputs. The output of the DAC 520 may be connected to the bus of the optical lens having a tunable focal length 10 through a cable 530. The VGU 500 may be configured to receive a control command from a control device 540 or a user, and in this case, the control device 540 may be, for example, a control circuit by which the optical lens having a tunable focal length 10 is operated. Such a control command source is not limited to the example provided above, and there may be various modifications of the control device 540 and/or a system according to each application of the optical lens having a tunable focal length 10.

For example, the control command from the user may be a physical operation of pressing a key provided in the VGU 500 or touching a touch panel provided in the VGU 500, or may be an operation for each input unit of the VGU 500 connected to a part of the user's body or a voice command of the user. To this end, a motion recognition sensor or a speech recognition sensor may be provided. As an example of the operation for each input unit of the VGU 500 connected to a part of the user's body, a control command may be provided according to the positions of the pupils of the user. The control command from the control device 540 may be electrical and/or optical impulses. The control command input to the VGU 500 may transmit information about a required optical power.

After receiving the control command, the microcontroller 510 of the VGU 500 may calculate a phase profile of light corresponding to the required optical power or load the phase profile of light from a memory, and convert it into a dependency between a voltage and a bus number. The bus number corresponds to an output number of the DAC 520. The microcontroller 510 may apply a digital signal including voltage information (voltage profiles) for each of all buses to the input of the DAC 520. Thereafter, the DAC 520 may convert the received digital signal into an analog signal. Accordingly, an electrical impulse sequence shown in FIG. 4 may be provided from the DAC 520 to each bus through the cable 530. Each bus may thus apply a voltage to the electrode elements 110 connected thereto. A positive voltage A of FIG. 4 may be determined according to the voltage-phase dependency of the electroactive material used. Based on the voltage-phase dependency, the value of voltage applied to generate a phase delay defined by the phase profile of light corresponding to the optical power may be determined.

The electroactive material may be selected according to voltage-phase dependency properties. After determining the material according to the dependency between the phase delay of light transmitting the material and the voltage of the control electrode 100, in order to generate a certain optical power to be used, the voltage may be applied such that the phase profile of light transmitting matches the phase profile of light of an ideal thin lens having an optical power equal to the optical power to be used. This voltage application process may be automated by a known standard algorithm (see US20150277151 A1).

Referring to FIGS. 4 and 5, as an example of the electroactive material, an E7-type liquid crystal mixture having a thickness of 6 μm may be used. A negative voltage B, a positive impulse time Ta, a negative impulse time Tb and a zero-voltage time Tc may vary depending on the properties of the electroactive material and the dynamic properties of the optical lens having a tunable focal length 10 in a specific application. For example, typical parameters for the E7-type liquid crystal mixture having a thickness of 6 μm may be B=A, Ta=Tb=1 μs to 100 ms, and Tc=0. An impulse shape may be a rectangular or non-rectangular shape, in particular a triangular shape to change the dynamic properties of the optical lens having a tunable focal length 10.

The control electrode including the electrode elements arranged in concentric circles will be described in more detail.

Referring to FIGS. 1A to 2B, the optical lens having a tunable focal length 10 according to an embodiment of the disclosure has a circular aperture shape, but is not limited to a circular aperture shape lens, and the lens may have any other suitable aperture shape, for example, a rectangular, polygonal or curved shape. For example, the lens aperture may have any shape depending on actual requirements according to the optical system, size restrictions, the shape and size of the electrode element, or the like.

According to an embodiment of the disclosure, the control electrode 100 may operate as one of the plurality of electrode patterns 102 and 104 at a time arranged concentrically with respect to each other, in which case, the radius of each of the plurality of electrode patterns 102 and 104 is limited by the aperture size of the optical lens having a tunable focal length 10, and the radii of the plurality of electrode patterns 102 and 104 may have the same maximum value within the above limited value. For example, when the optical lens having a tunable focal length 10 having an aperture radius of 20 mm, the radii of the plurality of electrode patterns 102 and 104 may have the same maximum value of 20 mm, and the radius of the electrode element 110 may be calculated according to the maximum value. That is, the control electrode 100 may operate as the plurality of electrode patterns 102 and 104 having the same maximum radius.

The radii of the plurality of electrode elements 110 of the control electrode 100 including the concentric ring electrode element 110 may be calculated based on the radii of the Fresnel zones. As the radius r of the lens increases, a maximum optical power D decreases, thus, when the optical lens having a tunable focal length 10 having a large aperture, the range of the optical power D may be limited. The relationship described above will be described in more detail with respect to Equation 2 below.

$$N_{max} = \frac{1}{\frac{r \cdot D \cdot \Delta R}{2\lambda} \cdot \left(2 - \frac{\Delta R}{r}\right)}$$ [Equation 2]

In Equation 2, $N_{max}$ denotes the maximum number of addressable electrode elements 110 per Fresnel zone with respect to the optical lens having a tunable focal length 10 with an optical power D, a lens radius r, and an incident light wavelength λ. Here, the period in which the plurality of electrode elements 110 are arranged includes the width of one electrode element 110 and a gap between the one electrode element 110 and the other electrode element among the plurality of electrode elements 110. Here, a technical restriction ΔR is equal to the sum of the technically feasible minimum width of the electrode element 110 and the technically feasible minimum gap between the electrode elements 110, and the sum of the width of an outer electrode element 110 and the gap between the outer electrode element 110 and the preceding electrode element 110 which is adjacent to the outer electrode and inside the outer electrode element cannot be less than the technical restriction, for example, the technical restriction may be about 1 μm.

According to an embodiment of the disclosure, with respect to the technical restriction ΔR for the optical lens having a tunable focal length 10 having an optical power range of −3 D to 3 D and an aperture radius r (at least 20 mm), and the period of the electrode elements 110, a minimum diffraction efficiency η may be selected according to the actual requirements of the optical system. Based on the selected diffraction efficiency, the number L of phase levels per Fresnel zone for a corresponding diffractive lens is calculated according to Equation 3 below.

$$\eta(L) = \text{sinc}^2\left(\frac{1}{L}\right) = \left[\frac{\sin(\pi/L)}{\pi/L}\right]^2$$ [Equation 3]

According to an embodiment of the disclosure, the control electrode 100 may operate as either of the plurality of electrode patterns 102 and 104 at a time including the plurality of concentric ring electrode elements 110, and here, the plurality of electrode patterns 102 and 104 may appear to be superimposed with each other. The widths of the plurality of ring electrode elements 110 of each of the superimposed electrode patterns 102 and 104 are as follows.

For an electrode element with number ($m_i$; $n_j$), the following parameters are calculated according to Equations 4 to 7 below.

$$m_j = 1, \ldots, m_{d_1}$$ [Equation 4]

$$m_{d_1} = \frac{r^2 \cdot \Delta}{2\lambda}; n_j = 1, \ldots, N_1$$ [Equation 5]

$$r^{int}_{m_i, n_j} = \sqrt{2\left(m_i - 1 + \frac{n_j - 1}{N_1}\right) \cdot \frac{\lambda}{\Delta}}$$ [Equation 6]

$$r^{ext}_{m_i, n_j} = \sqrt{2\left(m_i - 1 + \frac{n_j}{N_1}\right) \cdot \frac{\lambda}{\Delta}} - g$$ [Equation 7]

Here, $r^{int}$ denotes the inner radius of the electrode with number ($m_i$; $n_j$), $r^{ext}$ denotes the outer radius of the electrode with number ($m_i$; $n_j$), $m_i$ denotes a Fresnel zone number, and $n_j$ denotes the number of the electrode element 110 of the Fresnel zone. That is, each Fresnel zone has the numbers of the corresponding electrode elements 110, for example, a first electrode element (1,1), a second electrode element (1,2), and a third electrode element (1,3) may be in a first Fresnel zone, and a first electrode element (2,1), a second electrode element (2,2), and a third electrode element (2,3) may be in a second Fresnel zone. $m_d$ denotes the maximum number of Fresnel zones for the optical lens having a tunable focal length 10 having an aperture radius r, and provides a dioptric step Δ of a light wavelength λ. $N_1$ denotes the number of the electrode elements 110 per Fresnel zone of the optical lens having a tunable focal length 10, A denotes a light wavelength, and g denotes a gap between the electrode elements 110. According to the above embodiment, light having a wavelength λ is light in the visible band. However, in various embodiments of the disclosure, the light may also include infrared or ultraviolet light.

The width of the ring electrode element 110 of the optical lens having a tunable focal length 10 is calculated according to Equation 8.

$$\Delta w_{i,j}^1 = r_{m_i,n_j}^{ext} - r_{m_i,n_j}^{int} =$$ [Equation 8]

$$\sqrt{2\frac{\lambda}{\Delta}} \cdot \left( \sqrt{m_i - 1 + \frac{n_j}{N_1}} - \sqrt{m_i - 1 + \frac{n_j - 1}{N_1}} \right) - g =$$

$$\Delta w_{i,j}^{(1)}(r, \lambda, \Delta, g, N_i, L)$$

A plurality of addressable electrode elements 110, that is, a plurality of electrode elements 110 to which a corresponding voltage is applied from the control electrode 100 of the optical lens having a tunable focal length 10 may be selected based on the following. The selection of the addressable electrode elements 110 is related to the selection of an optical power. The optical power is related to the number of Fresnel zones, that is, the addressable electrode elements 110 may be selected according to the number and positions of the Fresnel zones to be activated. Here, a voltage may be applied according to the voltage-phase dependency described above, and this voltage profile may be applied such that the phase profile of light transmitting to generate an optical power that matches the phase profile of light of the ideal thin lens having the desired optical power.

In the optical lens having a tunable focal length 10, the control electrode 100 may operate as either of the plurality of electrode patterns at a time, the radii of the electrode elements of each of the plurality of electrode patterns may be calculated as described above based on the properties of the Fresnel zone, and each Fresnel zone may be shunted by the same buses. This is referred to as a standard method of "shunting electrodes". Unlike the related art that involves a plurality of control electrodes, the control electrode 100 of the optical lens having a tunable focal length 10 according to an embodiment of the disclosure may operate as either of the plurality of superimposed electrode patterns 102 and 104 at a time. The term "superimposed" does not mean that electrodes are physically "superimposed" with each other, but means that one control electrode 100 may operate as one of the plurality of electrode patterns 102 and 104 at a time, even when the same electrodes and/or the buses are used, by applying different voltage values to different electrode groups, and the plurality of electrode patterns 102 and 104 may appear to be superimposed with each other.

For example, when the control electrode 100 operates as one of the first electrode pattern 102 and the second electrode pattern 104 at a time, the radii of all of the electrode elements 110 may be calculated with respect to the first electrode pattern 102 of the optical lens having a tunable focal length 10 having an aperture diameter of 20 mm. The radii of the electrode elements 110 may correspond to the Fresnel zone that provides an optical power of 3 D, and in combination with the standard method of shunting electrodes described above, may be calculated such that a Fresnel zone is formed that provides a set of optical power values (i.e., 0.5 D, 1 D, 1.5 D, 2 D, 2.5 D, and 3 D) (hereinafter, referred to as a first optical power set) with an increment of 0.5 D. The second electrode pattern 104 of the same lens may be calculated such that all of the radii of the electrode elements 110 provide an optical power of 2.75 D, and in combination with the standard method of shunting electrodes, may be calculated to provide optical power values of 2.25 D and 2.75 D (multiples of 0.25 D) (hereinafter, referred to as a second optical power set). While the related art may provide the first optical power set or the second optical power set by using one control electrode, it is unable to provide all of them with the one control electrode. However, the optical lens having a tunable focal length 10 according to an embodiment of the disclosure may provide the first optical power set and the second optical power set by using one control electrode 100.

According to an embodiment of the disclosure, because one optical lens having a tunable focal length 10 having an aperture of 20 mm may operate as either of two different electrode patterns 102 and 104 at a time by using one control electrode 100, the radius of each of the first and second electrode patterns 102 and 104 may be calculated to be equal to the size of the control electrode 100. In addition, the first and second electrode patterns 102 and 104 in the control electrode 100 may be alternately operated, and the first electrode pattern 102 including a set of radii need to be substantially superimposed concentrically with the second electrode pattern 104 including another set of radii. In order to implement the operation of the two electrode patterns 102 and 104 in one control electrode 100, the control electrode 100 may include a plurality of electrode elements 110 having the radii of the electrode elements of both of the two electrode patterns 102 and 104.

For example, when a central circular electrode element of the first electrode pattern has a diameter of 0.5 mm, and a central circular electrode element of the second electrode pattern has a diameter of 0.3 mm, "superimposition" of the electrode patterns may be achieved by using two electrode elements. That is, a central circular electrode element E1 having a diameter of 0.3 mm and a ring electrode element E2 having a thickness of 0.1 mm ((0.5 mm-0.3 mm)/2=0.1 mm) may be arranged in different layers (one above and the other below), and the gap therebetween may be minimized. The gap may be minimized such that it is approximately, in theory, 0 μm~0.1 μm.

Hereinafter, the implementation of the operation of the electrode elements for the control electrode that operates in two electrode patterns will be discussed. In the above example, the central circular electrode element E1 having a diameter of 0.3 mm and the ring electrode element E2 having a width of 0.1 mm may be respectively connected to a bus B1 of the first bus set, and this may correspond to a first electrode pattern in which the diameter of the central circular electrode element is 0.5 mm. That is, when the same voltage is applied to the E1 and the E2, the electroactive material layer of the optical lens having a tunable focal length may operate as if the voltage is applied by a single electrode element having a diameter of 0.5 mm. In order to implement a second electrode pattern, the E1 may be connected to a bus B2 of the second bus set, and the E2 may be connected to a bus B3 of the second bus set, and, in this case, different voltage values may be applied to each of the buses B2 and B3 to implement a phase profile of light corresponding to the second electrode pattern. When a voltage is applied to the B2 and/or the B3, the electroactive material layer of the optical lens having a tunable focal length may operate as if the voltage is applied by a central circular electrode element having a diameter of 0.3 mm or a ring electrode element having a width of 0.1 mm, and this may correspond to the second electrode pattern. The E1 may be connected to the buses B1 and B2 through two via-holes, and the E2 may be connected to the buses B1 and B3 through two via-holes. Accordingly, in the embodiment described above, each electrode element of the control electrode may be connected to two or more buses.

Thus, the fact that the control electrode appears as if the plurality of electrode patterns are superimposed with each other does not mean that a plurality of electrode pattern layers are physically superimposed with each other, but rather, by applying, through the buses, voltage values to the electrode elements or the electrode group corresponding to each pattern, the plurality of electrode patterns are implemented based on one control electrode. This can be understood as a kind of electrode topologies described above.

According to an embodiment of the disclosure, when the E1 and the E2 are connected to the bus B1 and a voltage is applied through the B1 and viewed from the electroactive material layer of the optical lens having a tunable focal length, the two electrode elements may appear as a circular electrode element having a diameter of 0.5 mm (the first electrode pattern in the above example). The electroactive material layer may respond to a voltage profile corresponding to the first electrode pattern is implemented. In a case where a voltage is applied, through the bus B2, to the E1 connected to the bus B2, and another voltage is applied, through the bus B3, to the E1 connected to the bus B3, the electroactive material layer of the optical lens having a tunable focal length may respond to a voltage profile corresponding to the second electrode pattern is implemented.

According to another embodiment of the disclosure, for example, the central circular electrode element of the first electrode pattern has a diameter of 0.5 mm, the ring electrode element of the first electrode pattern has a width of 0.1 mm, the central circular electrode element of the second electrode pattern has a diameter of 0.3 mm, and the ring electrode element of the second electrode pattern has a width of 0.2 mm, and this may also be represented by one control electrode through "superimposition". That is, the control electrode including the central circular electrode element E1 having a diameter of 0.3 mm, a first ring electrode element E2 having a width of 0.1 mm surrounding the central circular electrode element E1, and a second ring electrode element E3 having a width of 0.1 mm surrounding the first ring electrode element may operate as one of the first electrode pattern and the second electrode pattern at a time. The bus B1 and the bus B2 may be connected to the E1, the bus B1 and the bus B3 may be connected to the E2, and a bus B4 and the bus B3 may be connected to the E3. Here, the B1 and the B4 may be included in the first bus set, the first bus set may operate the first electrode pattern, the B2 and the B3 may be included in the second bus set, and the second bus set may operate the second electrode pattern. When a voltage is applied to the E1, the E2, the E3, through the B1, the control electrode may operate as if the voltage is applied to the first electrode pattern through the bus B1, and when a voltage is applied to the bus B4, the control electrode may operate as if the voltage is applied to the first electrode pattern through the bus B4. When a voltage is applied to the E1, the E2, and the E3, through the B2, the control electrode may operate as if the voltage is applied to the second electrode pattern through the bus B2, and when a voltage is applied through the bus B3, the control electrode may operate as if the voltage is applied to the second electrode pattern through the bus B3. The E1 and The E3 may be arranged on the same layer, whereas the E2 may arranged on another layer (one above or the other below), and the gap therebetween may be minimized. In this case, the gap may be minimized, in theory, approximately to 0 μm~0.1 μm.

According to an embodiment of the disclosure, the radius of the concentric ring electrode element may be determined based on the radius (hereinafter, referred to as a first radius) of each of the plurality of electrode elements calculated with respect to the first electrode pattern 102 and the radius (hereinafter, referred to as a second radius) of each of the plurality of electrode elements calculated with respect to the second electrode pattern 104. In order to implement the control electrode that operates as either of the first electrode pattern and the second electrode pattern at a time, concentric ring electrode elements having the first radii ($r_1, r_2, \ldots, r_n, \ldots$) and the second radii ($R_1, R_2, \ldots, R_n, \ldots$) may be formed. Here, one or more ring electrode elements may be between adjacent radii $r_n$ and $r_{n+1}$ of the first radii, and when a plurality of ring electrode elements are between the adjacent radii $r_n$ and $r_{n+1}$, the plurality of ring electrode elements may be connected to the same bus among the first bus set that operates the first electrode pattern, and one or more ring electrode elements may be between adjacent radii $R_n$ and $R_{n+1}$ of the second radii. When a plurality of ring electrode elements are between the adjacent radii $R_n$ and $R_{n+1}$, the plurality of ring electrode elements may be connected to the same bus among the second bus set that operates the second electrode pattern. However, in the above embodiment, one control electrode is not limited to operating as the two electrode patterns, but may operate as N electrode patterns (where N is a natural number greater than or equal to 1), and in this case, it may include N bus sets, and the plurality of electrode elements may be connected to one bus for each of the N bus sets, so as to receive a plurality of N different voltages alternately applied.

Accordingly, the control electrode may provide a plurality of optical power sets. For example, the first electrode pattern may provide the optical powers of the first optical power set (0.5 D, 1 D, 1.5 D, 2 D, 2.5 D, and 3 D), and the second electrode pattern may provide the optical powers of the second optical power set. That is, the operation of several electrode patterns "superimposed" with each other may be implemented by using one control electrode, and each of these electrode patterns may form a Fresnel zone set corresponding to an optical power set.

Unlike the related art that uses a set (stack) of two or more optical lenses having a tunable focal length, the optical lens having a tunable focal length according to an embodiment of the disclosure may have sets of unique optical power values with only one optical lens having a tunable focal length. That is, when the electroactive material layer of the optical lens having a tunable focal length is formed of liquid crystals, it is possible to implement sets of unique optical power values with only one liquid crystal cell. In the above example, the control electrode that operates as the two electrode patterns may provide a set of optical power values of the first optical power set (0.5 D, 1 D, 1.5 D, 2 D, 2.5 D, and 3 D) and the second optical power set. Through this, focus tuning may be performed, and in particular, detailed optical radiation may be performed on an object of interest within an optical power range of 2 D to 3 D. The optical power values are provided according to an embodiment of the disclosure, and other specific optical power values may also be provided according to a specific implementation or application of the optical lens having a tunable focal length.

The control electrode of the optical lens having a tunable focal length according to an embodiment of the disclosure may include a plurality of electrode elements, a plurality of buses may be connected to the plurality of electrode elements, and the control electrode may operate as one of a plurality of electrode patterns at a time. In the related art, a plurality of liquid crystal cells or a plurality of lenses are used to implement various electrode patterns, whereas the optical lens having a tunable focal length according to the above embodiment may be provided with a low thickness by using one liquid crystal cell or one lens, and accordingly, the volume of the entire device or system may be reduced. In addition, as one liquid crystal cell or one optical lens having a tunable focal length is used, only two substrates are used to reduce light diffusion that intensifies as the number of substrates increases, and thus blur may be reduced. In addition, because one optical lens having a tunable focal length may operate as either of several electrode patterns at a time by using one control electrode, various optical power ranges may be provided. This may enable an improvement in perception of depth such that a virtual object image is realistically expressed, and may produce an effect of correcting refractive errors in the user's eyes without additional equipment. In addition, various optical power ranges may eliminate vergence-accommodation conflicts that may cause the user to experience nausea and eye fatigue.

Figure 6:
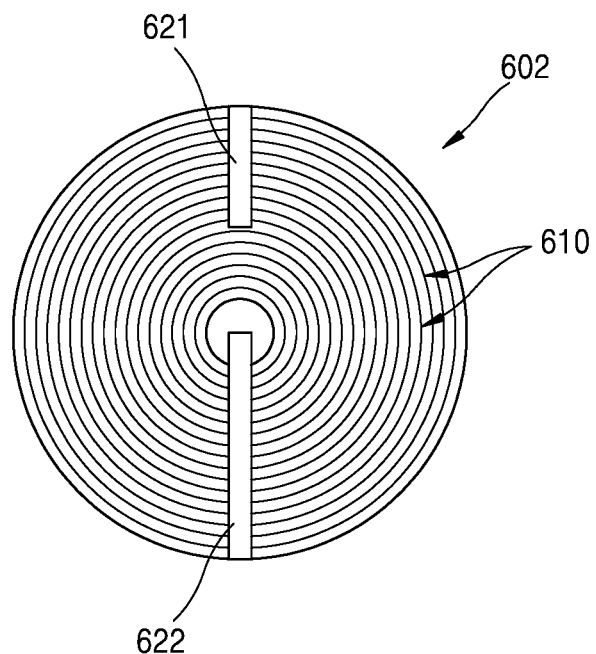
FIG. 6 is a plan view of a control electrode operating as a first electrode pattern, according to an embodiment.
Figure 7:
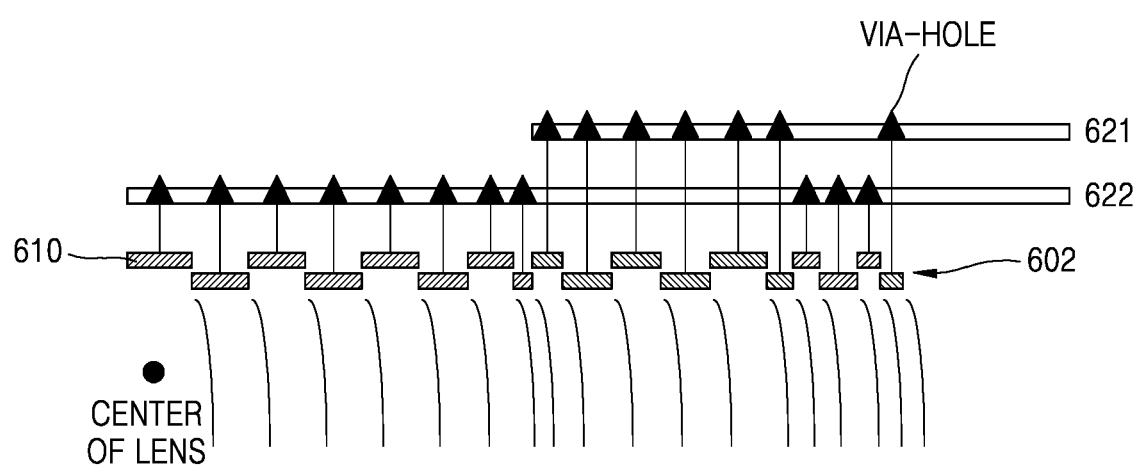
FIG. 7 is a conceptual diagram of connections of a plurality of buses and electrode elements of a first electrode pattern in the embodiment of FIG. 6.

FIG. 6 is a plan view of a control electrode 600 operating as a first electrode pattern 602, according to an embodiment, FIG. 7 is a conceptual diagram of connections of a plurality of buses 621 and 622 (hereinafter, also referred to as the first bus 621 and the second bus 622) and electrode elements 610 of the first electrode pattern 602 in the embodiment of FIG. 6.

Referring to FIG. 6, one or more electrode elements 610 of the control electrode 600 may be electrically connected to the first bus 621 through via-holes, and one or more electrode elements 610 of the control electrode 600 may be electrically connected to the second bus 622 through via-holes. Referring to FIG. 7, each electrode element 610 as described above is electrically connected to one of the plurality of buses 621 and 622. The arcs away from the center of the lens in FIG. 7 indicates the radii of the plurality of electrode elements 610 having the shape of concentric ring electrodes.

Referring to FIG. 6, the control electrode 600 may be a control electrode that operates only as the first electrode pattern 602. When the control electrode 600 operates as the first electrode pattern 602, it may have one optical power value of 0.33 D. That is, the tunable lens obtains an optical power of 0.33 D when a voltage profile is applied, and obtains an optical power of 0 D when a voltage is not applied. Here, the diffraction efficiency is 40.5%, the control electrode 602 includes 64 ring electrode elements and provides 32 Fresnel zones. Two buses are connected to each of the 32 Fresnel zones.

Figure 8:
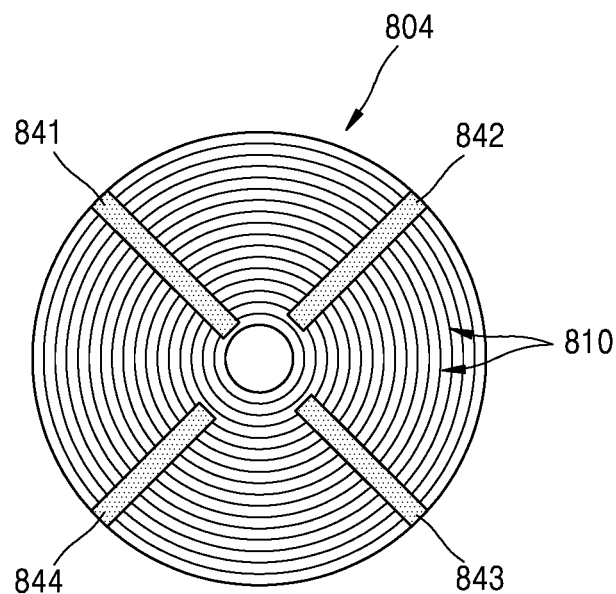
FIG. 8 is a plan view of a control electrode operating as a second electrode pattern according to an embodiment.
Figure 9:
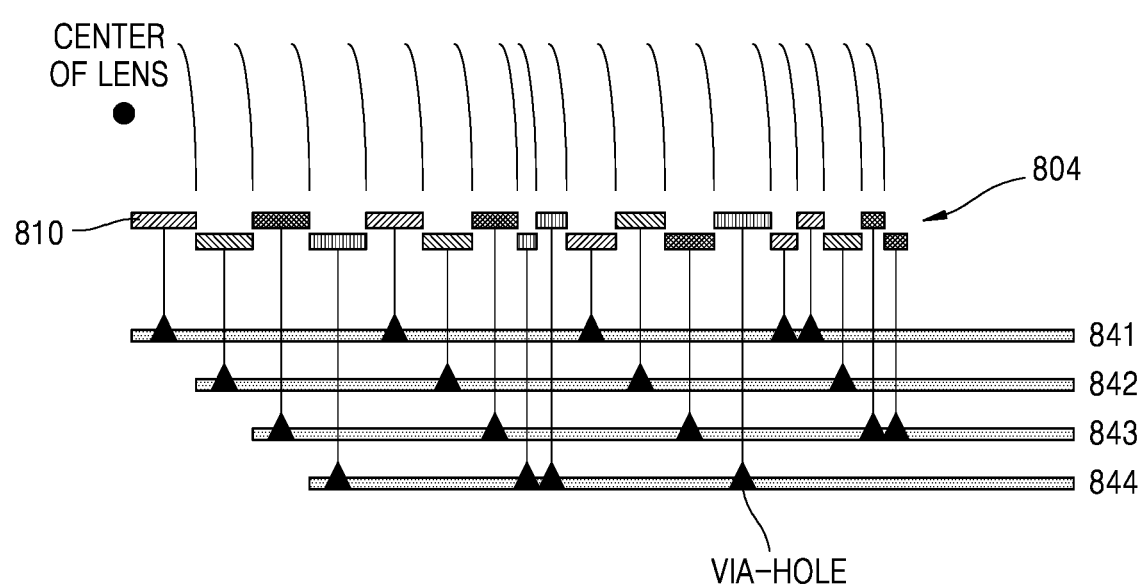
FIG. 9 is a conceptual diagram of connections of a plurality of buses and electrode elements of a second electrode pattern in the embodiment of FIG. 8.

FIG. 8 is a plan view of a control electrode 800 operating as a second electrode pattern 804 according to an embodiment, and FIG. 9 is a conceptual diagram of connections of a plurality of buses 841, 842, 843, and 844 (hereinafter, also referred to as the first bus 841, the second bus 842, the third bus 843, and the fourth bus 844) and electrode elements 810 of the second electrode pattern 804 in the embodiment of FIG. 8.

Referring to FIG. 8, one or more electrode elements 810 of the control electrode 800 may be electrically connected to the first bus 841, the second bus 842, the third bus 843, or the fourth bus 844 through via-holes. Referring to FIG. 9, each electrode element 810 as described above is electrically connected to one of the buses 841, 842, 843, and 844. The arcs away from the center of the lens in FIG. 7 indicates the radii of the plurality of electrode elements 810 having the shape of concentric ring electrodes.

Referring to FIG. 8, the control electrode 800 may be a control electrode that operates only as the second electrode pattern 804. When the control electrode 800 operates as the second electrode pattern 804, an optical power of 1.5 D with a diffraction efficiency of 81.1% and an optical power of 3 D with a diffraction efficiency of 40.5% may be obtained. Here, the control electrode 800 includes 576 ring electrode elements and provides 144 Fresnel zones. Four buses are connected to each of the 144 Fresnel zones.

Figure 10:
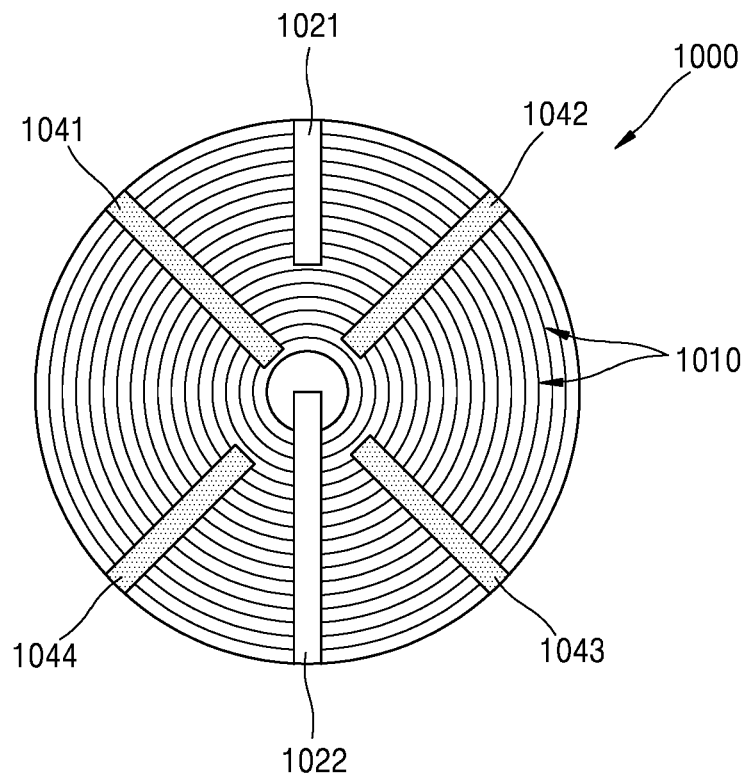
FIG. 10 is a plan view of a control electrode according to an embodiment.
Figure 11:
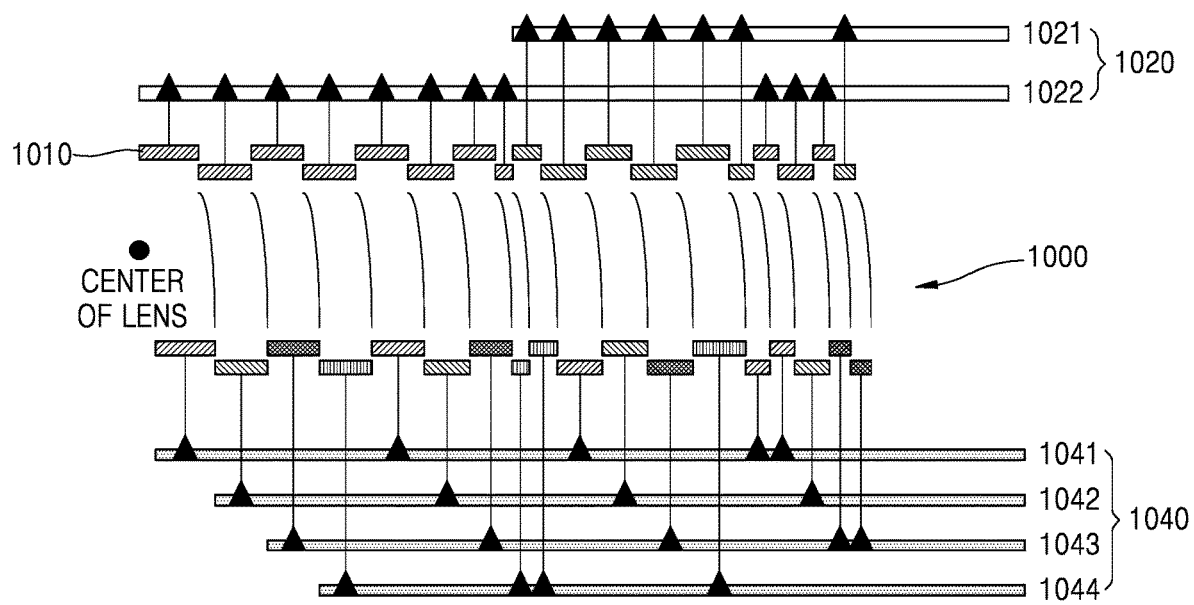
FIG. 11 is a conceptual diagram of connections of a plurality of buses and electrode elements of a control electrode in the embodiment of FIG. 10.

FIG. 10 is a plan view of a control electrode 1000 according to an embodiment, and FIG. 11 is a conceptual diagram of connections of a plurality of buses 1021, 1022, 1041, 1042, 1043, and 1044 (hereinafter, also referred to as the first bus 1021, the second bus 1022, the third bus 1041, the fourth bus 1042, the fifth bus 1043, and the sixth bus 1044) and electrode elements 1010 of the control electrode 1000 in the embodiment of FIG. 10.

Referring FIGS. 10 and 11, the control electrode 1000 may include two bus sets 1020 and 1040 (hereinafter, also referred to as the first bus set 1020, and the second bus set 1040), a first bus set includes a first bus 1021 and a second bus 1022, and a second bus set 1040 includes a third bus 1041, a fourth bus 1042, a fifth bus 1043 and a sixth bus 1044. Two bus sets are connected to each electrode element 1010. The control electrode 1000 may operate as one of the first electrode pattern 602 of FIG. 6 and the second electrode pattern 804 of FIG. 8 at a time, and only two substrates are used to implement two optical power sets. Compared with the related art using two or more control electrodes and three or more substrates, image blur due to light diffusion may be reduced by using only two substrates. When one control electrode 1000 operates as either of the two electrode patterns 602 and 804 at a time, a wide range of optical power may be obtained with one control electrode 1000. Referring to FIGS. 10 and 11, in the control electrode 1000, an optical power of 0.33 D with a diffraction efficiency of 40.5% corresponding to the first electrode pattern 602, and an optical power of 1.5 D with a diffraction efficiency of 81.1% and an optical power of 3 D with a diffraction efficiency of 40.5% corresponding to the second electrode pattern 804 may be obtained. According to the above example, the first electrode pattern 602 may be implemented by the two buses 1021 and 1022 of the first bus set 1020, and the second electrode pattern 804 may be implemented by the four buses 1041, 1042, 1043 and 1044 of the second bus set 1040.

The optical lens having a tunable focal length may be used as a part of the augmented reality (AR) or virtual reality (VR) display device 20. In such a display device, one or more optical lenses having a tunable focal length may be used, which provide AR or VR optical cells having a tunable focal length. The optical cell having a tunable focal length may be a tunable liquid crystal cell (LC), but is not limited thereto, and electroactive materials other than liquid crystals may be used.

Figure 12:
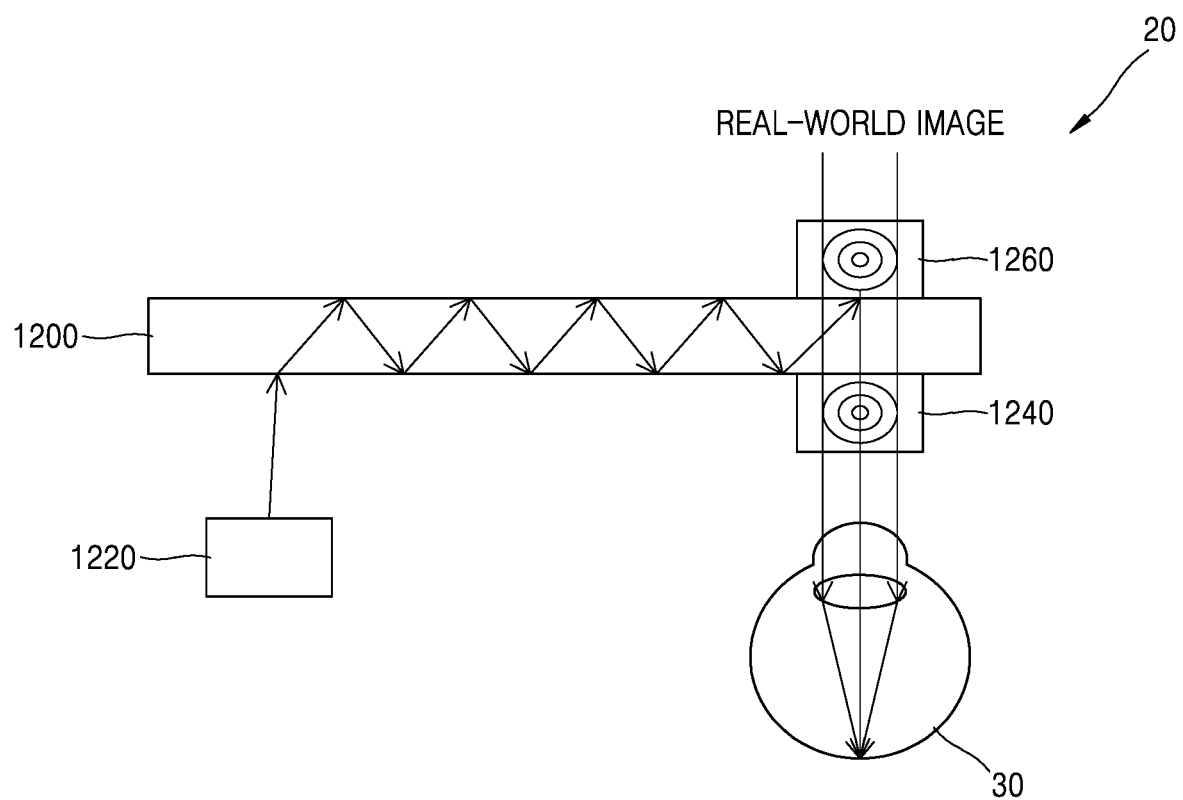
FIG. 12 is a schematic diagram of an augmented reality/virtual reality (AR/VR) display device including at least one optical lens having a tunable focal length, according to an embodiment.

FIG. 12 is a schematic diagram of the AR/VR display device 20 including at least one optical lens having a tunable focal length, according to an embodiment. Referring to FIG. 12, when the optical lens having a tunable focal length is used in the AR or VR display device 20, the display device 20 may include an optical waveguide 1200, a virtual object image source 1220, and at least one optical lens having a tunable focal length. The optical waveguide 1200 may connect the virtual object image source 1220, a display to display a virtual object image, and the optical lens having a tunable focal length to each other. The optical waveguide

1200 may include a first side facing a user's eye 30 and a second side opposite to the first side. The optical lens having a tunable focal length may be on the first side or may be on the second side. Alternatively, the optical lens having a tunable focal length may be between the optical waveguide 1200 and the virtual object image source 1220. For example, one or more optical lenses having a tunable focal length may be arranged in the optical waveguide 1200, and, in a case where the electroactive material is liquid crystals, the optical lens having a tunable focal length may be referred to as a liquid crystal cell (LC). A first liquid crystal cell (hereinafter, LC1) 1240 may be between the optical waveguide 1200 and the virtual object image source 1220, a second liquid crystal cell (hereinafter, LC2) 1260 may be in front of the user's eye.

Figure 13:
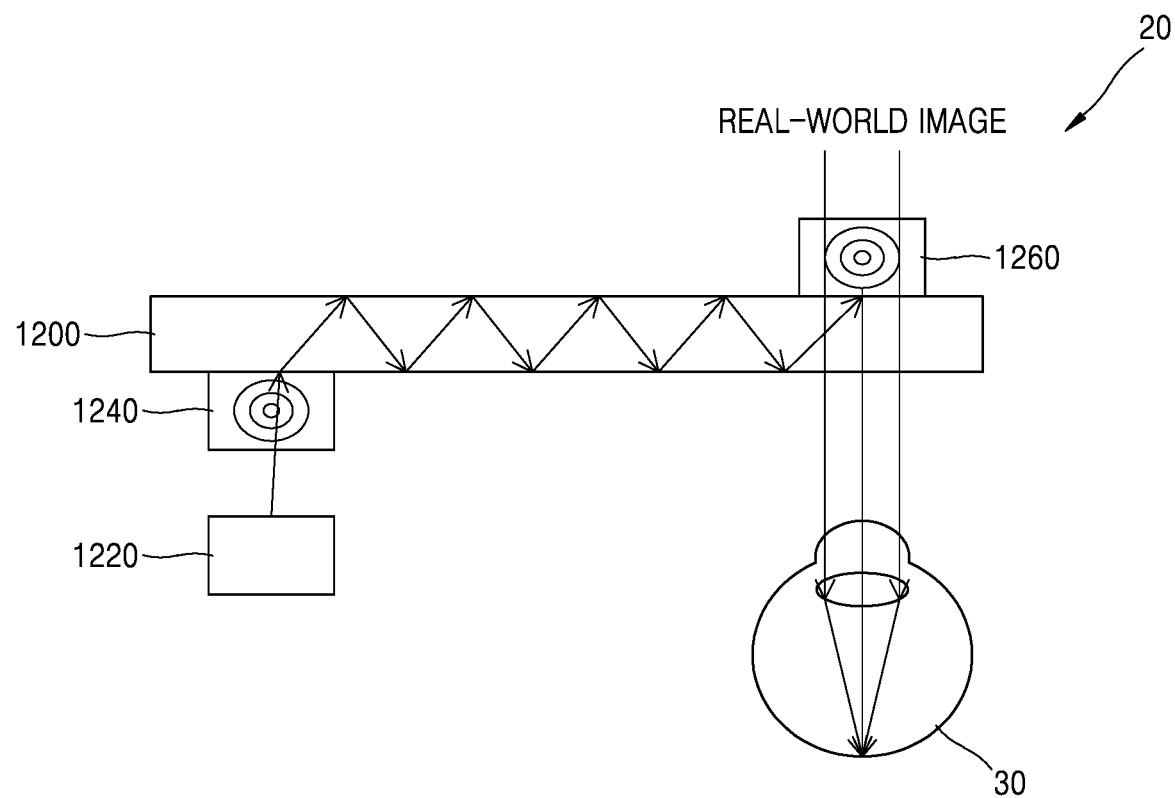
FIG. 13 is a schematic diagram of an AR/VR display device including at least one optical lens having a tunable focal length, according to an embodiment.

FIG. 13 is a schematic diagram of the AR/VR display device 20 including at least one optical lens having a tunable focal length, according to an embodiment. Here, the LC1 1240 and the LC2 1260 may be substantially the same as the optical lens having a tunable focal length 10 of FIG. 2A.

According to an embodiment of the disclosure, the optical lens having a tunable focal length may be used by both a user with normal vision and a user with refractive errors in his/her eyes. Referring to FIG. 12, the optical waveguide 1200 includes the first side facing the user's eye 30 and the second side opposite to the first side, the LC1 1240 is on the first side, and the LC2 1260 is on the second side. In a case of the user with normal vision, the LC1 1240 may be used only for translating a virtual object image output from the virtual object image source 1220 with an optical power of D0=0. In this case, the LC2 1260 may be used to compensate for the optical power induced by the LC1 1240 for unobscured viewing of the real world. For example, when the user's eye 30 is focusing on a focal plane of −3 D to view a real-world image, an optical power of −3 D may be provided to the LC1 1240 such that the virtual object image is changed from D0=0 to −3 D, and an optical power of 3 D may be provided to the LC2 1260 to compensate for the changed optical power.

When the user with refractive errors (e.g., presbyopia, nearsightedness, farsightedness, etc.) in his/her eyes, the LC1 1240 may be used for translating a virtual object image corrected by an optical power value required to correct the refractive errors. Also, the LC2 1260 may be used to correct the user's refractive errors for unobscured and clear viewing of the real world. For example, when the user's eye has a refractive error by −1 D and is attempting to focus on a focal plane of −3 D to view the real-world image, for the virtual object image of D0=0, an optical power of −2 D may be provided to the LC1 1240, and an optical power of 3 D may be provided to the LC2 1260.

In a case of the user with refractive errors in his/her eyes, the example illustrated in FIG. 13 is also possible, in which the optical waveguide 1200 includes the first side facing the user's eye 30 and the second side opposite to the first side, and the LC1 1240 is between the virtual object image source 1220 and the optical waveguide 1200, and the LC2 1260 is on the second side. This configuration of the AR display device 20 may correct the user's refractive errors (e.g., presbyopia, nearsightedness, farsightedness, etc.) and may enable unobscured viewing of a real-world image and a virtual object image. Because the optical lens having a tunable focal length as a part of the AR/VR display device 20 according to the embodiments of FIGS. 12 and 13 or the optical lens having a tunable focal length itself may correct the user's vision, the AR/VR display device 20 does not need to be used together with extra glasses or lenses designed for vision correction, and thus may have a small volume and light weight.

Figure 14:
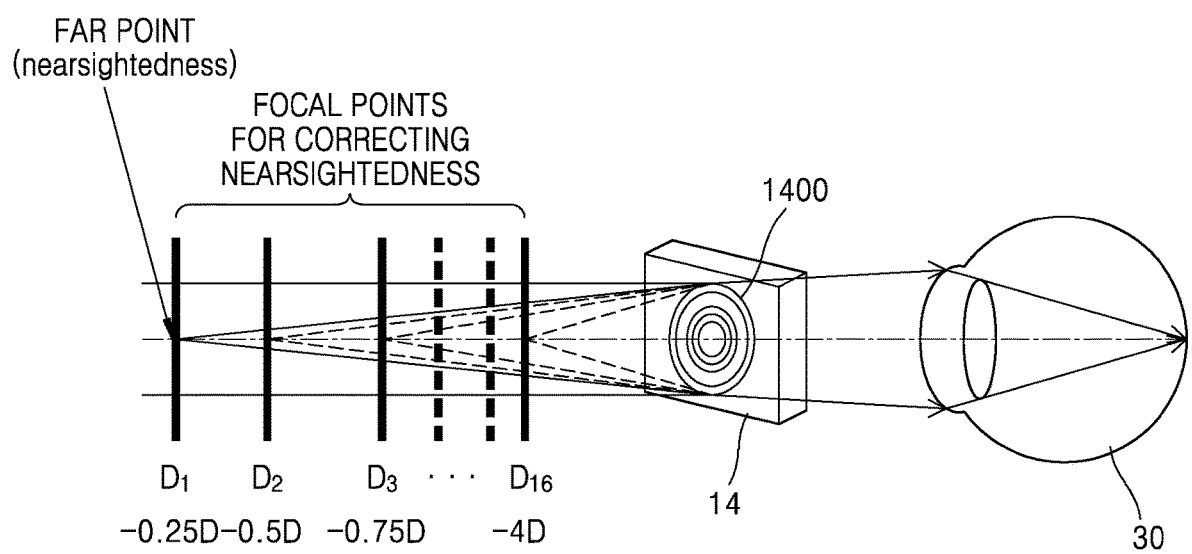
FIG. 14 illustrates a configuration of an embodiment in which an optical lens having a tunable focal length having a polarization-dependent structure is used to correct refractive errors in a user's eye.

FIG. 14 illustrates a configuration of an optical lens having a tunable focal length 14 having a polarization-dependent structure used to correct refractive errors in the user's eye, according to an embodiment.

Referring to FIG. 14, a method performed by the optical lens having a tunable focal length 14 including a control electrode 1400 according to an embodiment, for correcting the refractive errors in the user's eye is provided. FIG. 14 illustrates the polarization-dependent optical lens having a tunable focal length 14 arranged in front of the nearsighted user's eye 30. In addition, FIG. 14 also shows focal planes provided by the optical lens having a tunable focal length 14 at different optical power values (D1=−0.25 D to D16=−4 D), and, compared with a focal point ("far point" in FIG. 14) of the nearsighted user's eye 30, the focal point moves to the focal plane corresponding to D16=−4 D. Accordingly, the optical lens having a tunable focal length 14 according to an embodiment of the disclosure may correct the refractive errors of the user's eye at a maximum optical power of 4 D.

Figure 15:
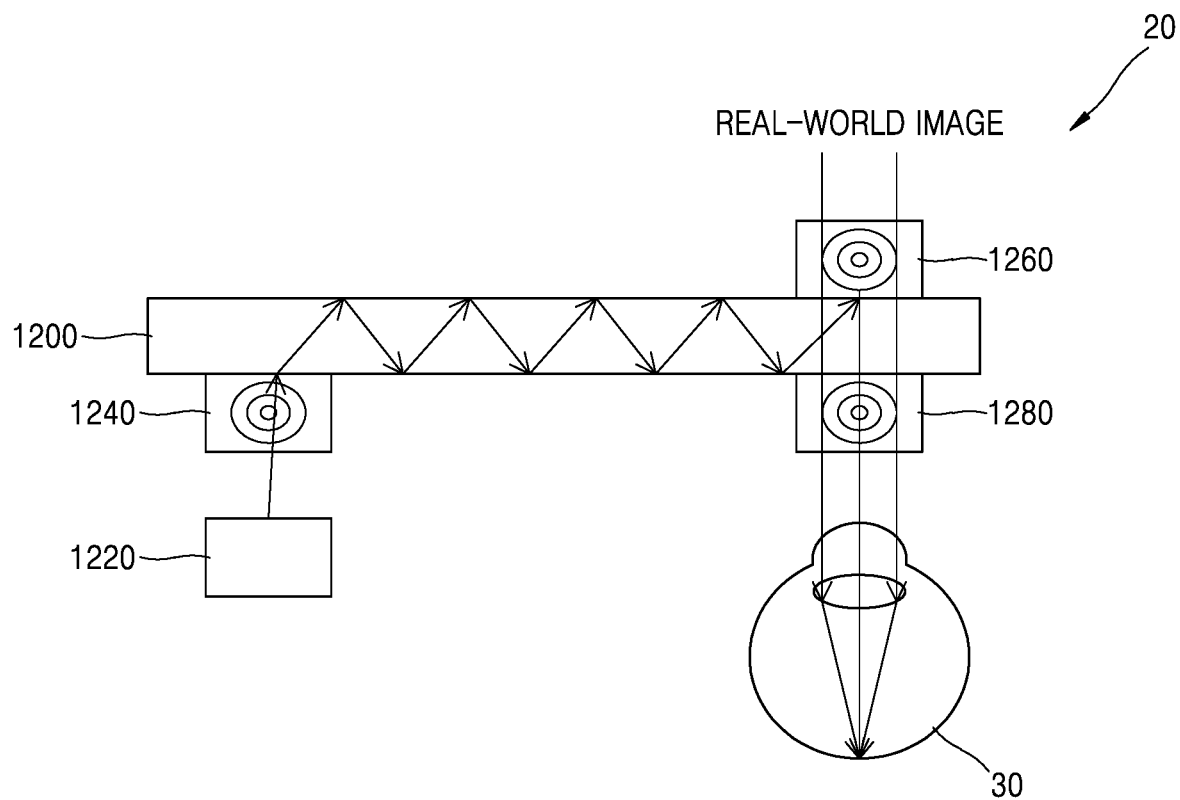
FIG. 15 is a schematic diagram illustrating a selective mode of a tunable lens arrangement in an AR/VR display device, according to an embodiment.

FIG. 15 is a schematic diagram illustrating a selective mode of a tunable lens arrangement in the AR/VR display device 20, according to an embodiment of the disclosure. Here, the LC1 1240, the LC2 1260 and an LC3 1280 may be substantially the same as the optical lens having a tunable focal length 10 of FIG. 2A.

The LC1 1240, the LC2 1260 and the LC3 1280 indicate positions at which at least one optical lens having a tunable focal length may be arranged in the display device 20. The use of at least one optical lens having a tunable focal length may provide the AR/VR display device 20 with a dual mode, in which a first mode may an operation mode for users with normal vision. In the first mode, the LC2 1260 may compensate for an optical power induced by the LC3 1280 to provide unobscured viewing of the real world through the display device 20, and the LC3 1280 may be used for translating a virtual object image output from the virtual object image source 1240. A second mode may be an operation mode of the AR/VR display device 20 for correcting refractive errors (e.g., presbyopia, nearsightedness, farsightedness, or the like) in the user's eye. Here, the LC1 1240 may be used for translating a virtual object image corrected by an optical power value required to correct the refractive errors. The LC2 1260 may be used to correct the refractive errors, and through this, unobscured and clear viewing of the real world through the AR/VR display device 20 may be provided.

According to an embodiment of the disclosure, at least one optical lens having a tunable focal length may be used in the augmented reality (AR) display device 20 to provide realistic perception of depth of a real-world object image and/or a virtual object image being displayed, correct refractive errors in the user's eye, and eliminate vergence-accommodation conflicts (VACs).

In another embodiment of the disclosure, an array of optical lenses having a tunable focal length may be implemented, and in this case, a plurality of optical lenses having a tunable focal length 10 in FIG. 2A may be sequentially arranged. Accordingly, the maximum diameter of the optical system may be increased, and the maximum optical power of an optical lens system having a tunable focal length may be increased in applications requiring long diameters.

For example, a plurality of optical lenses having a tunable focal length may be used, which may be combined in the form of a set (stack) of optical lenses having a tunable focal length, in which case, each of the plurality of optical lenses having a tunable focal length included in the set (stack) may include one control electrode that operates as one of a plurality of electrode patterns at a time. Accordingly, it is advantageous in that more optical power sets may be provided. For example, when a stack of two optical lenses having a tunable focal length is used, a control electrode of a first optical lens having a tunable focal length may have an optical power value of 0.33 D corresponding to a first electrode pattern, and optical power values of 1 D, 2 D, and 3 D corresponding to a second electrode pattern, a control electrode of a second optical lens having a tunable focal length may have optical power values of 0.5 D, 1.5 D, and 2.5 D corresponding to a third electrode pattern, and an optical power value of 0.25 D corresponding to a fourth electrode pattern, and accordingly, an optical power combination including a set of optical power values of the first optical lens having a tunable focal length, a set of optical power values of the second optical lens having a tunable focal length, and a set of optical power values obtained by the sum of the two sets may be obtained. The most significant advantage of this stacking method is that it may provide multiple optical power values. For example, an optical power value of 2.83 D, which is the sum of 0.33 D and 2.5 D, may be provided.

In addition, the optical lens having a tunable focal length according to an embodiment of the disclosure may be used in a helmet-mounted display device, an automotive head-up display (HUD display) device, smart goggles, a display device of a tablet computer, a smart phone, and other portable and/or wearable computing devices. It may also be used for vision correction glasses having a tunable focal length according to an embodiment of the disclosure. As one or more embodiments of the optical lens having a tunable focal length, only some examples for the field of use have been described, and the scope of protection of the disclosure is not limited to those mentioned above.

The optical lens having a tunable focal length according to an embodiment of the disclosure has a low thickness, and thus the size of the entire system including the corresponding lens may be reduced.

Because the optical lens having a tunable focal length according to an embodiment of the disclosure uses only one control electrode, light diffusion caused by the use of a plurality of substrates may be reduced.

The optical lens having a tunable focal length according to an embodiment of the disclosure has a wide range of optical power by using only one lens thereby providing realistic perception of depth, eliminating vergence-accommodation conflicts, and correcting refractive errors in the user's eyes.

The optical lens having a tunable focal length according to an embodiment of the disclosure may be used in augmented reality and virtual reality display devices to simultaneously display a virtual object image and a real-world image.

While the one or more embodiments are described in detail in the disclosure, the scope of the disclosure is not limited by the one or more embodiments. Other embodiments may be derived by those skilled in the art within the scope of the disclosure, and all such modifications, improvements, and/or replacements are considered as falling within the scope of the disclosure. Therefore, the scope of the disclosure should not be determined by the described embodiments, but should be determined by the technical spirit described in the claims.

What is claimed is:

1. An optical lens having a tunable focal length, the optical lens comprising:
    a control electrode comprising a plurality of electrode elements;
    an electroactive material layer provided on the control electrode;
    a common electrode spaced apart from the control electrode, wherein the electroactive material layer is interposed between the common electrode and the control electrode; and
    a plurality of bus sets, each bus set of the plurality of bus sets comprising a plurality of buses,
    wherein the plurality of bus sets comprise a first bus set and a second bus set,
    wherein the first bus set is configured to apply a first voltage to the plurality of electrode elements to generate a first phase profile of light, and
    wherein the second bus set is configured to apply a second voltage to the plurality of electrode elements to generate a second phase profile of light.

2. The optical lens of claim 1, wherein at least one electrode element among the plurality of electrode elements is configured to receive at least one of the first voltage from the first bus set or the second voltage from the second bus set, and
    wherein the first voltage is different from the second voltage.

3. The optical lens of claim 1, wherein at least one electrode element is configured to alternately receive the first voltage from the first bus set and the second voltage from the second bus set.

4. The optical lens of claim 1, wherein the control electrode is configured to operate as a first electrode pattern corresponding to the first phase profile of light, or in a second electrode pattern corresponding to the second phase profile of light.

5. The optical lens of claim 1, wherein each electrode element of the plurality of electrode elements in the control electrode is connected to the first bus set and the second bus set,
    the electroactive material layer is configured to provide a first optical power based on the first voltage being applied to generate the first phase profile of light, and
    the electroactive material layer is configured to provide a second optical power based on the second voltage being applied to generate the second phase profile of light.

6. The optical lens of claim 1, wherein two electrode elements adjacent to each other among the plurality of electrode elements in the control electrode are configured to receive a same voltage from the first bus set, or receive different voltages from the second bus set.

7. The optical lens of claim 1, wherein each of the plurality of electrode elements in the control electrode is connected to the first bus set and the second bus set through via-holes.

8. The optical lens of claim 1, wherein the control electrode further comprises one or more electrode groups corresponding to one or more Fresnel zones.

9. The optical lens of claim 8, wherein the first bus set of the plurality of bus sets comprises:
    a first bus configured to apply the first voltage to a first electrode group of the one or more electrode groups; and a second bus configured to apply a third voltage different from the first voltage to a second electrode group of the one or more electrode groups.

10. The optical lens of claim 9, wherein a first area of the electroactive material layer corresponding to the first electrode group and a second area of the electroactive material layer corresponding to the second electrode group have different optical power values.

11. The optical lens of claim 1, wherein the plurality of electrode elements in the control electrode have a concentric ring shape.

12. The optical lens of claim 1, wherein the plurality of electrode elements in the control electrode have a polygonal set electrode shape or a parallel stripe electrode shape.

13. The optical lens of claim 1, wherein the electroactive material layer comprises at least one of nematic liquid crystals, smectic liquid crystals, cholesteric liquid crystals, a polymer gel, electroactive polymers, liquid crystalline polymers, polymer dispersed liquid crystals, polymer-stabilized liquid crystals, or self-assembled nonlinear supramolecular structures.

14. The optical lens of claim 1, wherein the optical lens having the tunable focal length is of a polarization-dependent structure or a polarization-independent structure.

15. An augmented reality and/or virtual reality display device comprising the optical lens having the tunable focal length according to claim 1.

16. The device of claim 15, further comprising:
an optical waveguide; and
a virtual object image source configured to provide a virtual object image,
wherein the optical lens having the tunable focal length is provided on the optical waveguide.

17. The device of claim 16, wherein the optical waveguide comprises a first side facing a user's eye and a second side opposite to the first side, and
wherein the optical lens having the tunable focal length is provided on the first side.

18. The device of claim 16, wherein the optical waveguide comprises a first side facing a user's eye and a second side opposite to the first side, and
wherein the optical lens having the tunable focal length is provided on the second side.

19. The device of claim 16, wherein the optical lens having the tunable focal length is between the optical waveguide and the virtual object image source.

20. The device of claim 16, wherein the optical lens having the tunable focal length is configured to correct a refractive error in a user's eye.

* * * * *